(12) United States Patent
Ibuki

(10) Patent No.: US 9,357,583 B2
(45) Date of Patent: May 31, 2016

(54) GATEWAY NODE DEVICE, SENSOR NODE DEVICE, AND METHOD FOR CONTROLLING ACTIVE TIME PERIOD

(71) Applicant: FUJITSU LIMITED, Kawasaki-shi (JP)

(72) Inventor: Jun Ibuki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 319 days.

(21) Appl. No.: 13/717,891

(22) Filed: Dec. 18, 2012

(65) Prior Publication Data

US 2013/0208622 A1 Aug. 15, 2013

(30) Foreign Application Priority Data

Feb. 9, 2012 (JP) ................................ 2012-025942

(51) Int. Cl.
*H04L 12/28* (2006.01)
*H04W 84/18* (2009.01)

(52) U.S. Cl.
CPC ..................................... *H04W 84/18* (2013.01)

(58) Field of Classification Search
USPC ........... 370/230, 230.1, 231, 254, 310, 395.4, 370/401, 437, 477, 537; 707/797, E17.012; 709/239, 224, 226, 235, 242
See application file for complete search history.

(56) References Cited

U.S. PATENT DOCUMENTS

| | | | | |
|---|---|---|---|---|
| 7,428,221 | B2 * | 9/2008 | Thubert et al. ................. | 370/255 |
| 7,978,666 | B2 * | 7/2011 | Keshavarzian et al. ........ | 370/338 |
| 8,031,720 | B2 * | 10/2011 | Yagyu et al. ............ | H04L 88/08 370/401 |
| 8,085,686 | B2 * | 12/2011 | Thubert et al. ........... | H04L 45/04 370/254 |
| 8,340,116 | B2 * | 12/2012 | Huang et al. .......... | H04W 84/18 370/314 |
| 8,724,557 | B2 * | 5/2014 | Shin et al. ....................... | 370/329 |
| 2002/0141331 | A1 * | 10/2002 | Mate et al. .................... | 370/218 |
| 2003/0058826 | A1 * | 3/2003 | Shearer, III .................... | 370/338 |
| 2004/0017863 | A1 * | 1/2004 | Learned .......................... | 375/340 |
| 2004/0032852 | A1 * | 2/2004 | Thubert et al. ................ | 370/349 |
| 2004/0117339 | A1 * | 6/2004 | Thubert et al. .................... | 707/1 |
| 2006/0009267 | A1 | 1/2006 | Lee et al. | |
| 2006/0153099 | A1 * | 7/2006 | Feldman ................. | H04L 45/00 370/254 |
| 2006/0227724 | A1 * | 10/2006 | Thubert .................. | H04L 45/48 370/254 |

(Continued)

FOREIGN PATENT DOCUMENTS

JP 2007-243794 9/2007
JP 2008-502275 1/2008

(Continued)

OTHER PUBLICATIONS

Japanese Office Action dated Jun. 2, 2015 in corresponding Japanese Patent Application No. 2012-025942.

*Primary Examiner* — Phuongchau Ba Nguyen
(74) *Attorney, Agent, or Firm* — Staas & Halsey LLP

(57) ABSTRACT

A processor of a gateway node device determines whether to divide a first tree included in a tree structure formed by sensor node devices intermittently operating and the gateway node device as a root of the tree structure. The first tree includes a first node device as a root. The processor divides, upon determining to divide the first tree, the first tree into a second tree and a third tree at a second node device different from the first node device. The second node device is a root of the second tree. The second node device is a child node of the third tree. The processor assigns active time periods within an intermittent operation cycle to the respective second and third trees. The assigned active time periods are mutually disjoint. The processor notifies sensor node devices included in the first tree of the assigned active time periods.

8 Claims, 23 Drawing Sheets

(56) References Cited

U.S. PATENT DOCUMENTS

| | | | |
|---|---|---|---|
| 2006/0271661 A1* | 11/2006 | Qi et al. | 709/223 |
| 2007/0171910 A1 | 7/2007 | Kumar | |
| 2008/0219237 A1* | 9/2008 | Thubert | H04L 45/16 370/349 |
| 2009/0147714 A1* | 6/2009 | Jain et al. | 370/311 |
| 2009/0322518 A1* | 12/2009 | Liang et al. | 340/539.18 |
| 2010/0215014 A1* | 8/2010 | Jones et al. | 370/329 |
| 2011/0167217 A1* | 7/2011 | Montgomery | 711/114 |
| 2012/0320768 A1* | 12/2012 | Shaffer et al. | 370/252 |

FOREIGN PATENT DOCUMENTS

| | | |
|---|---|---|
| JP | 2008-244756 | 10/2008 |
| JP | 2011-155653 | 8/2011 |

\* cited by examiner

FIG. 7

| NODE | UPPER NODE | LOWER NODE | LEVEL | NUMBER OF ISSUANCES | NUMBER OF RECEPTIONS | NUMBER OF TRANSMISSIONS | GROUP |
|---|---|---|---|---|---|---|---|
| 5 |  | 6a,6b | 0 | 0 | 14 | 35 | A |
| 6a | 5 | 6c,6d | 1 | 1 | 6 | 10 | A |
| 6b | 5 | 6e,6f | 1 | 1 | 6 | 11 | A |
| 6c | 6a | 6g,6h | 2 | 1 | 2 | 2 | A |
| 6d | 6a | 6i,6j | 2 | 1 | 2 | 2 | A |
| 6e | 6b | 6k | 2 | 1 | 1 | 1 | A |
| 6f | 6b | 6l,6m | 2 | 1 | 3 | 4 | A |
| 6g | 6c |  | 3 | 1 | 0 | 0 | A |
| 6h | 6c |  | 3 | 1 | 0 | 0 | A |
| 6i | 6d |  | 3 | 1 | 0 | 0 | A |
| 6j | 6d |  | 3 | 1 | 0 | 0 | A |
| 6k | 6e |  | 3 | 1 | 0 | 0 | A |
| 6l | 6f |  | 3 | 1 | 0 | 0 | A |
| 6m | 6f | 6n | 3 | 1 | 1 | 1 | A |
| 6n | 6m |  | 4 | 1 | 0 | 0 | A |

FIG. 10

| PACKET TYPE (USED FOR MEASURING TRANSMISSION TIME) | GROUP (GROUP A) | SPECIFIED TIME (01:02:34) |

FIG. 12

| NODE | UPPER NODE | LOWER NODE | LEVEL | NUMBER OF ISSUANCES | NUMBER OF RECEPTIONS | NUMBER OF TRANSMISSIONS | GROUP |
|---|---|---|---|---|---|---|---|
| 5 | | 6a,6b | 0 | 0 | 14 | 35 → 24 | A → A' |
| 6a | 5 | 6c,6d | 1 | 1 | 6 | 10 | A → A' |
| 6b | 5 | 6e,6f | 1 | 1 | 6 | 11 | A → A',B |
| 6c | 6a | 6g,6h | 2 | 1 | 2 | 2 | A → A' |
| 6d | 6a | 6i,6j | 2 | 1 | 2 | 2 | A → A' |
| 6e | 6b | 6k | 2 | 1 | 1 | 1 | A → B |
| 6f | 6b | 6l,6m | 2 | 1 | 3 | 4 | A → B |
| 6g | 6c | | 3 | 1 | 0 | 0 | A → A' |
| 6h | 6c | | 3 | 1 | 0 | 0 | A → A' |
| 6i | 6d | | 3 | 1 | 0 | 0 | A → A' |
| 6j | 6d | | 3 | 1 | 0 | 0 | A → A' |
| 6k | 6e | | 3 | 1 | 0 | 0 | A → B |
| 6l | 6f | | 3 | 1 | 0 | 0 | A → B |
| 6m | 6f | 6n | 3 | 1 | 1 | 1 | A → B |
| 6n | 6m | | 4 | 1 | 0 | 0 | A → B |

FIG. 14

| NODE | UPPER NODE | LOWER NODE | LEVEL | NUMBER OF ISSUANCES | NUMBER OF RECEPTIONS | NUMBER OF TRANSMISSIONS | GROUP |
|---|---|---|---|---|---|---|---|
| 5 |  | 6a,6b | 0 | 0 | 14 | 24 → 14 | A' → A" |
| 6a | 5 | 6c,6d | 1 | 1 | 6 | 10 | A' → A",C |
| 6b | 5 | 6e,6f | 1 | 1 | 6 | 11 | A',B → A",B |
| 6c | 6a | 6g,6h | 2 | 1 | 2 | 2 | A' → C |
| 6d | 6a | 6i,6j | 2 | 1 | 2 | 2 | A' → C |
| 6e | 6b | 6k | 2 | 1 | 1 | 1 | B |
| 6f | 6b | 6l,6m | 2 | 1 | 3 | 4 | B |
| 6g | 6c |  | 3 | 1 | 0 | 0 | A' → C |
| 6h | 6c |  | 3 | 1 | 0 | 0 | A' → C |
| 6i | 6d |  | 3 | 1 | 0 | 0 | A' → C |
| 6j | 6d |  | 3 | 1 | 0 | 0 | A' → C |
| 6k | 6e |  | 3 | 1 | 0 | 0 | B |
| 6l | 6f |  | 3 | 1 | 0 | 0 | B |
| 6m | 6f | 6n | 3 | 1 | 1 | 1 | B |
| 6n | 6m |  | 4 | 1 | 0 | 0 | B |

FIG. 17A

| RANK | GROUP | REPRESENTATIVE NODE | TRANSMISSION TIME | ACTIVATION TIMING | INACTIVATION TIMING |
|---|---|---|---|---|---|
| 1 | A | 6d | 12 | | |
| 2 | C | 6c | 12 | | |
| 3 | B | 6b | 8 | | |
| 4 | D | 5 | 14 | | |

FIG. 17B

| RANK | GROUP | REPRESENTATIVE NODE | TRANSMISSION TIME | ACTIVATION TIMING | INACTIVATION TIMING |
|---|---|---|---|---|---|
| 1 | A | 6d | 12 | 0 | 12 |
| 2 | C | 6c | 12 | 12 | 24 |
| 3 | B | 6b | 8 | 24 | 32 |
| 4 | D | 5 | 14 | 32 | 46 |

GATEWAY NODE DEVICE, SENSOR NODE DEVICE, AND METHOD FOR CONTROLLING ACTIVE TIME PERIOD

CROSS-REFERENCE TO RELATED APPLICATION

This application is based upon and claims the benefit of priority of the prior Japanese Patent Application No. 2012-025942, filed on Feb. 9, 2012, the entire contents of which are incorporated herein by reference.

FIELD

The embodiments discussed herein are related to a gateway node device, a node device, and a method for controlling an active time period.

BACKGROUND

As a protocol for an ad-hoc network formed by node devices performing an intermittent operation, there is a protocol that synchronizes inactive time periods such as sleep time periods with each other between node devices. As such a protocol, Sensor-MAC (S-MAC) has been known.

In addition, as a related technique, a wireless communication system has been known that includes a base station broadcasting a traffic indication message including first bit map information and second bit map information. The first bit map information indicates whether or not traffic exists with respect to a sleep mode ID group obtained by grouping a plurality of sleep mode IDs. The second bit map information indicates whether or not traffic occurs that corresponds to each sleep mode ID belonging to the sleep mode ID group. A terminal is assigned with one of the plural sleep mode IDs, and when having received a traffic indication message, the terminal determines, using the first bit map information, whether or not traffic exists in the sleep mode ID group to which the terminal itself belongs. When traffic exists in the sleep mode ID group to which the terminal itself belongs, the terminal determines, using the second bit map information, whether or not traffic for the terminal itself exists.

As another related technique, a wireless device has been known that is equipped with a processor acquiring a timing from a wireless communication network and monitoring, for the sake of peer-to-peer communication, a frame from another wireless device during a specified time interval determined on the basis of the timing from the communication network. The processor maintains a sleep state between the specified time intervals and wakes up prior to each specified time interval so as to monitor a frame from another wireless device.

As another related technique, a wireless sensor network has been known that is provided with a base station node equipped with a path construction mechanism, a data collection mechanism, and a path reconstruction mechanism. On the basis of the location information of wireless sensor nodes and mutual radio wave intensities, the path construction mechanism constructs a stable path in a tree shape and divides the path into groups. The data collection mechanism performs data collection from each group of the wireless sensor nodes, that is, acquires sensor data from a wireless sensor node serving as a group parent. When the data collection mechanism has failed in the data collection owing to a bad radio wave condition between the wireless sensor nodes, the path reconstruction mechanism does not perform path reconstruction immediately, and when the data collection mechanism has failed in the data collection more than M times, the path reconstruction mechanism performs path reconstruction.

Japanese National Publication of International Patent Application No. 2008-502275, Japanese Laid-open Patent Publication No. 2011-155653, and Japanese Laid-open Patent Publication No. 2007-243794 disclose related techniques.

In a network that synchronizes inactive time periods with each other between node devices, the relay of a packet is completed within an active time period between an inactive time period and a subsequent inactive time period, and hence, a transmission delay is reduced. However, when the network becomes large, the transmission time of a packet increases. Therefore, an inactive time period decreases with an increase in the size of the network.

SUMMARY

According to an aspect of the present invention, provided is a gateway node device that connects an ad-hoc network to another network. The ad-hoc network has a tree structure formed by sensor node devices intermittently operating and the gateway node device as a root of the tree structure. The gateway node device includes a processor. The processor determines whether to divide a first tree included in the tree structure. The first tree includes a first node device as a root of the first tree. The processor divides, upon determining to divide the first tree, the first tree into a second tree and a third tree at a second node device different from the first node device. The second node device is a root of the second tree. The second node device is a child node of the third tree. The processor assigns active time periods within an intermittent operation cycle to the respective second and third trees. The assigned active time periods are mutually disjoint. The processor notifies sensor node devices included in the first tree of the assigned active time periods.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a topology information table;

FIG. 10 is a diagram illustrating an example of a measurement control packet;

FIG. 12 is a diagram illustrating a topology information table at the time of first division;

FIG. 14 is a diagram illustrating a topology information table at the time of second division;

FIGS. 17A and 17B are diagrams illustrating examples of a schedule information table;

DESCRIPTION OF EMBODIMENTS

1. Example of Configuration of Communication System

Figure 1:
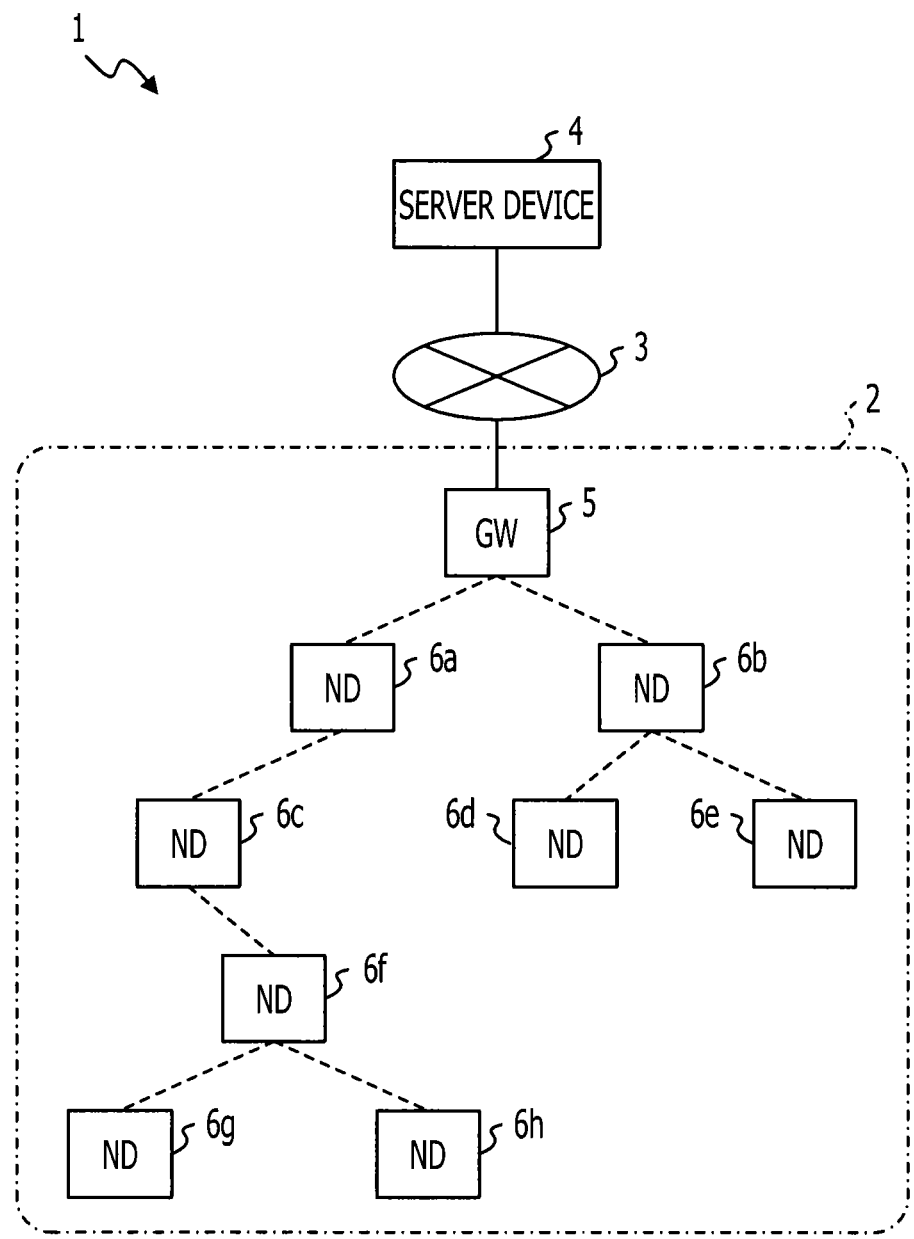
FIG. 1 is a diagram illustrating an example of a configuration of a communication system.

FIG. 1 is a diagram illustrating an example of a configuration of a communication system. A communication system 1 includes a wireless ad-hoc network 2, a communication network 3, and a server device 4. The wireless ad-hoc network 2 is formed by a gateway node device 5 and nodes including sensor node devices 6a to 6h . . . . The communication system 1 may be, for example, a data collection system where the server device 4 collects, through the gateway node device 5, pieces of meter reading data regarding electric power, gas, water, or the like obtained by the sensor node devices 6a to 6h.

In the following description and attached drawings, a wireless ad-hoc network is simply expressed as an "ad-hoc network" in some cases. In the following description, a gateway node device is expressed as a "gateway" and a sensor node device is expressed as a "node device" in some cases. In the attached drawings, a gateway node device is expressed as a "GW" and a sensor node device is expressed as an "ND" in some cases. In the following description, the node devices 6a to 6h . . . are collectively expressed as a "node device 6" in some cases.

A packet transmission destination of each of the gateway 5 and the node device 6 is determined by a routing protocol, and hence, the ad-hoc network 2 has a tree structure. The routing protocol may be, for example, dynamic source routing (DSR) protocol, Ad-hoc On-demand Distance Vector (AODV) routing protocol, or the like. In addition, the routing protocol may be optimized link state routing (OLSR) protocol, topology broadcast based on reverse-path forwarding (TBRPF), or the like.

By performing an intermittent operation where an active time period and an inactive time period are repeated with a given intermittent operation cycle T, the node device 6 saves power consumption. Hereinafter, a method for determining the active time period and the inactive time period will be described.

2. Method for Determining Active Time Period

When determining the active time period and the inactive time period, the gateway 5 determines whether or not the ad-hoc network 2 is larger than a predetermined size. When the ad-hoc network 2 is larger than the predetermined size, the gateway 5 divides the ad-hoc network 2 into a plurality of sub-trees. In the following description, a set of node devices 6 forming each sub-tree generated by dividing the ad-hoc network 2 is expressed as a "group" and a root of a sub-tree, namely, a topmost node, is expressed as a "representative node", in some cases. From among the node devices 6 of a group, a node device other than the representative node is expressed as a "child node", in some cases. In addition, before the ad-hoc network 2 is divided, the set of the node devices 6a to 6h forming the whole tree of the ad-hoc network 2 is also expressed as a "group", in some cases.

Figure 2:
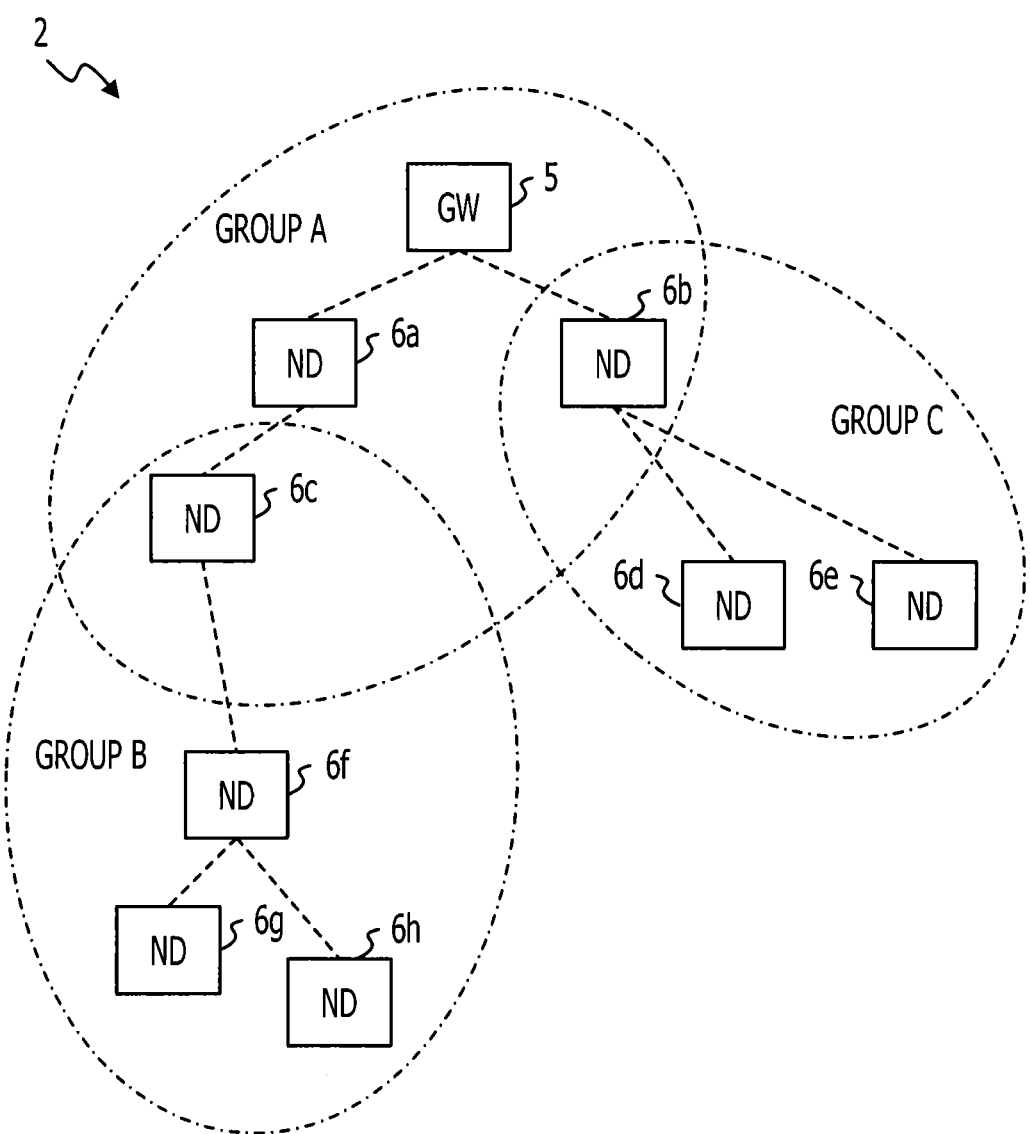
FIG. 2 is a diagram illustrating an example of division of a wireless ad-hoc network.

FIG. 2 illustrates an example of division of an ad-hoc network. The ad-hoc network 2 is divided into groups A, B, and C. The group A is formed by the gateway 5 and the node devices 6a to 6c. The representative node of the group A is the gateway 5. The node devices 6a and 6b are lower nodes of the gateway 5, directly connected to the gateway 5. The node device 6c is a lower node of the node device 6a, directly connected to the node device 6a.

The group B is formed by the node device 6c and the node devices 6f to 6h. The representative node of the group B is the node device 6c. The node device 6f is a lower node of the node device 6c, directly connected to the node device 6c. The node devices 6g and 6h are lower nodes of the node device 6f, directly connected to the node device 6f. The group C is formed by the node device 6b, the node device 6d, and the node device 6e. The representative node of the group C is the node device 6b. The node devices 6d and 6e are lower nodes of the node device 6b, directly connected to the node device 6b.

Figure 3:
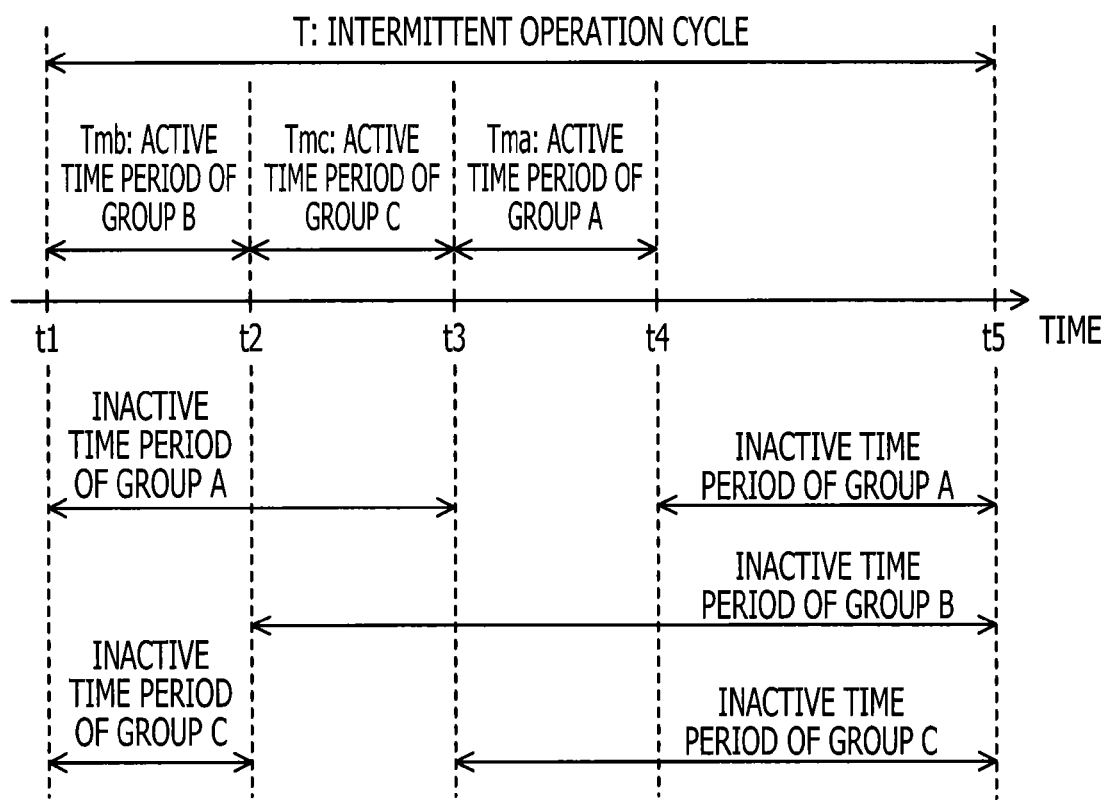
FIG. 3 is a diagram illustrating examples of active time periods specified for groups A to C illustrated in FIG. 2.

The gateway 5 causes nodes forming the respective groups A to C to alternately operate, by assigning time periods Tma, Tmb, and Tmc within the intermittent operation cycle T to the groups A, B, and C, respectively, as respective active time periods which are mutually disjoint. FIG. 3 is a diagram illustrating the active time periods Tma to Tmc specified for the groups A to C illustrated in FIG. 2. Time periods of time t1 to time t2, time t2 to time t3, and time t3 to time t4 within the intermittent operation cycle T extending from the time t1 to the time t5 are assigned to the active time periods Tmb, Tmc, and Tma, respectively. The inactive time period of the group A corresponds to time periods of t1 to t3 and t4 to t5. The inactive time period of the group B corresponds to time period of t2 to t5. The inactive time period of the group C corresponds to time periods of t1 to t2 and t3 to t5.

The ad-hoc network 2 is divided into the groups A to C in this way, and hence, the network size of each of the groups A to C becomes smaller than the network size of the ad-hoc network 2. In addition, the nodes in the groups A to C alternately operate, and hence, it may be possible to reduce the active time period of a node operating in each group.

In a single intermittent operation cycle T, an earlier active time period may be assigned to a group farther away from the gateway 5 serving as the root of the ad-hoc network 2 in decreasing order of distance. A distance between the gateway 5 and each group may be defined in accordance with the number of hops between the gateway 5 and the representative node of each group. In this case, a distance of a group from the gateway 5 increases with an increase in the number of hops of the representative node thereof from the gateway 5.

In the groups illustrated in FIG. 2, the representative node of the group GA is the gateway 5 itself, and the number of hops from the gateway 5 is "0". On the other hand, the numbers of hops of the representative nodes 6c and 6b of the groups B and C from the gateway 5 are "2" and "1", respectively. Therefore, as illustrated in FIG. 3, the gateway 5 assigns active time periods Tmb, Tmc, and Tma earlier in this order to the group B, C, and A, respectively. When the groups operate in decreasing order of distance from the gateway 5, it may be possible for a representative node, which has received packets from nodes in its group within its active time period of its group, to transmit to a representative node of an upper group within the same intermittent operation cycle T. Therefore, it may be possible to transmit a packet from a terminal node of the ad-hoc network 2 to the gateway 5 within the single intermittent operation cycle T.

3. Embodiment of Gateway Node Device

3.1. Example of Hardware Configuration of Gateway Node Device

Figure 4:
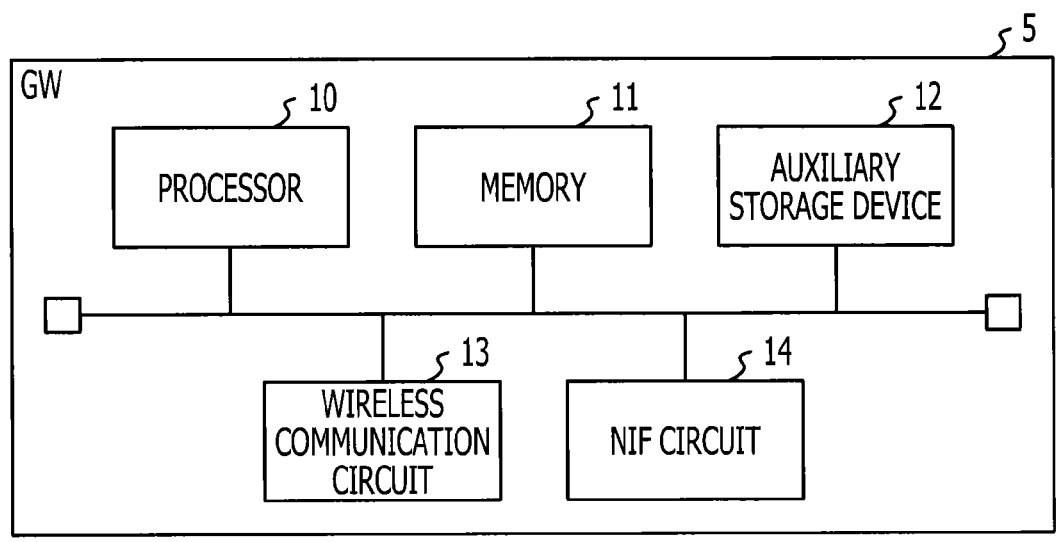
FIG. 4 is a diagram illustrating an example of a hardware configuration of a gateway node device.

An embodiment of each node of the ad-hoc network 2 will be described. FIG. 4 illustrates an example of a hardware configuration of the gateway 5. The gateway 5 includes a processor 10, a memory 11, an auxiliary storage device 12, a wireless communication circuit 13, and a network interface circuit 14. In the following description and attached drawings, a network interface is expressed as an "NIF" in some cases. The hardware configuration illustrated in FIG. 4 is one of exemplifications of a hardware configuration realizing the gateway 5. Any other hardware configuration may be adopted if the hardware configuration allows execution of processing described in "4. Processing for Controlling Active time period" described later.

By executing a control program stored in the auxiliary storage device 12, the processor 10 executes each processing for controlling the gateway 5 and the processing for controlling an active time period described later. The auxiliary storage device 12 stores a control program that causes the processor 10 to execute an operation. The auxiliary storage device 12 may include, as a storage element, a nonvolatile memory, a read-only memory (ROM), a hard disk, or the like.

The memory 11 stores a program currently being executed by the processor 10 and data temporarily used by the processor 10 in executing the program. The memory 11 may include a random access memory (RAM). The wireless communication circuit 13 performs wireless communication processing with the node device 6. The NIF circuit 14 performs communication processing with the communication network 3, and enables a signal to be transmitted and received to and from the server device 4.

3.2. Example of Functional Configuration of Gateway Node Device

Figure 5:
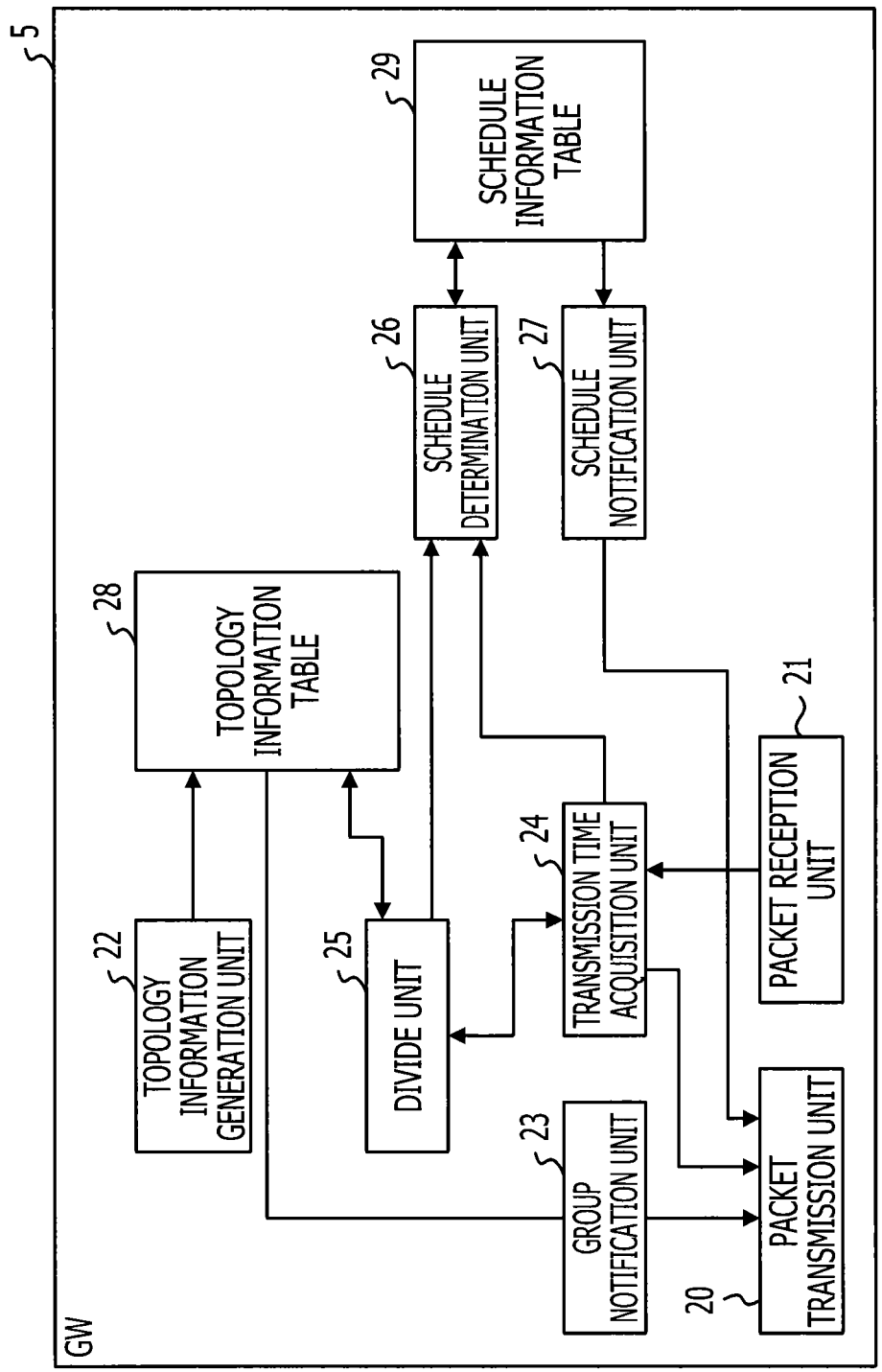
FIG. 5 is a diagram illustrating an example of a functional configuration of a gateway node device.

Functions of the gateway 5, which are realized by the above-described hardware, will be described. FIG. 5 illustrates an example of a functional configuration of the gateway 5. The gateway 5 includes a packet transmission unit 20, a packet reception unit 21, a topology information generation unit 22, a group notification unit 23, a transmission time acquisition unit 24, a divide unit 25, a schedule determination unit 26, and a schedule notification unit 27. In addition, the gateway 5 includes a topology information table 28 and a schedule information table 29. FIG. 5 mainly illustrates functions relating to the following description. The gateway 5 may include another configuration element other than the illustrated configuration elements.

The packet transmission unit 20 and the packet reception unit 21 performs processing for transmitting a packet to the node device 6 and processing for receiving a packet transmitted from the node device 6, through a wireless communication channel realized by the wireless communication circuit 13. The topology information generation unit 22 generates topology information expressing the network topology of the ad-hoc network 2. The topology information generation unit 22 may generate the topology information of the ad-hoc network 2 in accordance with, for example, a routing protocol such as TBRPF. In an embodiment in which another routing protocol is used, the topology information generation unit 22 generates the topology information of the ad-hoc network 2, for example, by collecting a path table generated by each node device 6.

Figure 6:
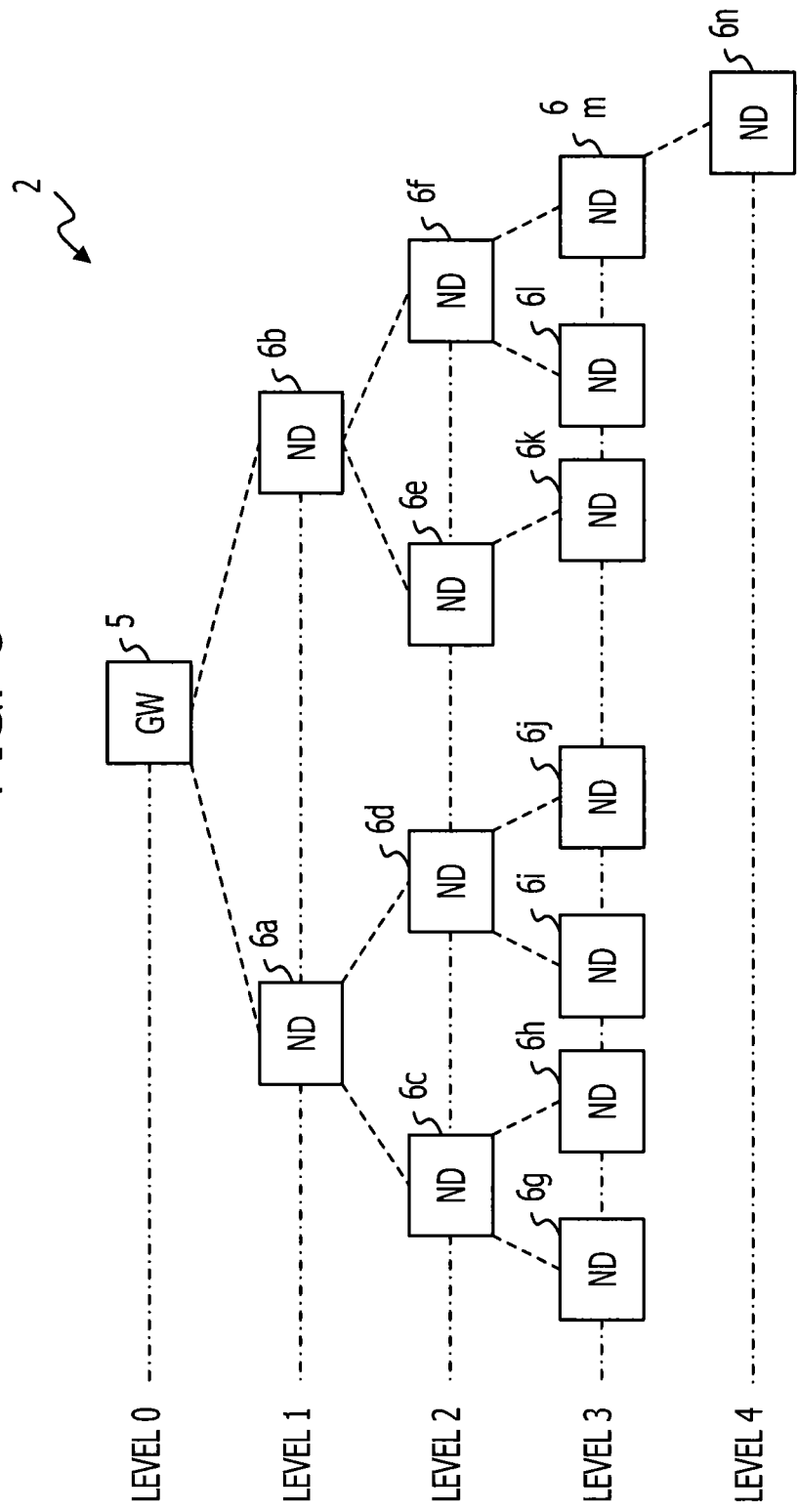
FIG. 6 is a diagram illustrating an example of a wireless ad-hoc network.

The topology information generation unit 22 generates the topology information table 28 expressing the network topology of the ad-hoc network 2. FIG. 6 is a diagram illustrating an example of the ad-hoc network 2, which is referred to in the following description of processing in the embodiments. The ad-hoc network 2 is formed by the gateway 5 and the node devices 6a to 6n. The node devices 6a and 6b are lower nodes of the gateway 5, directly connected to the gateway 5. The node devices 6c and 6d are lower nodes of the node device 6a, directly connected to the node device 6a. The node devices 6e and 6f are lower nodes of the node device 6b, directly connected to the node device 6b.

The node devices 6g and 6h are lower nodes of the node device 6c, directly connected to the node device 6c. The node devices 6i and 6j are lower nodes of the node device 6d, directly connected to the node device 6d. The node device 6k is a lower node of the node device 6e, directly connected to the node device 6e. The node devices 6l and 6m are lower nodes of the node device 6f, directly connected to the node device 6f. The node device 6n is a lower node of the node device 6m, directly connected to the node device 6m.

Since the ad-hoc network 2 has a tree structure, the number of hops from the gateway 5 to each of the node devices 6a to 6n is uniquely defined. In the following description, the number of hops from the gateway 5 to each of the node devices 6a to 6n is expressed as a "level". The level is an index expressing a distance from the gateway 5 to each of the node devices 6a to 6n. In the example of the tree structure in FIG. 6, the level of the gateway 5 is "0", the levels of the node devices 6a and 6b are "1", the levels of the node devices 6c to 6f are "2", the levels of the node devices 6g to 6m are "3", and the level of the node device 6n is "4".

FIG. 7 illustrates an example of the topology information table 28 corresponding to the ad-hoc network in FIG. 6. The topology information table 28 includes information elements, "node", "upper node", "lower node", "level", "number of issuances", "number of receptions", "number of transmissions", and "group". The information element "node" indicates a target node of each row in the topology information table 28. The information element "upper node" indicates the gateway 5 or a node device 6 serving as an upper node of the target node. The information element "lower node" indicates a node device 6 serving as a lower node of the target node. The information element "level" indicates a level of the target node. The information element "group" indicates a group to which the target node belongs. The information elements "number of issuances", "number of receptions", and "number of transmissions" will be described later.

In the example illustrated in FIG. 7, the second row relating to the node device 6a serving as a target indicates that the upper node of the node device 6a is the gateway 5, the lower nodes thereof are the node devices 6c and 6d, the level of the node device 6a is "1", and the node device 6a belongs to the "group A".

Figure 8:
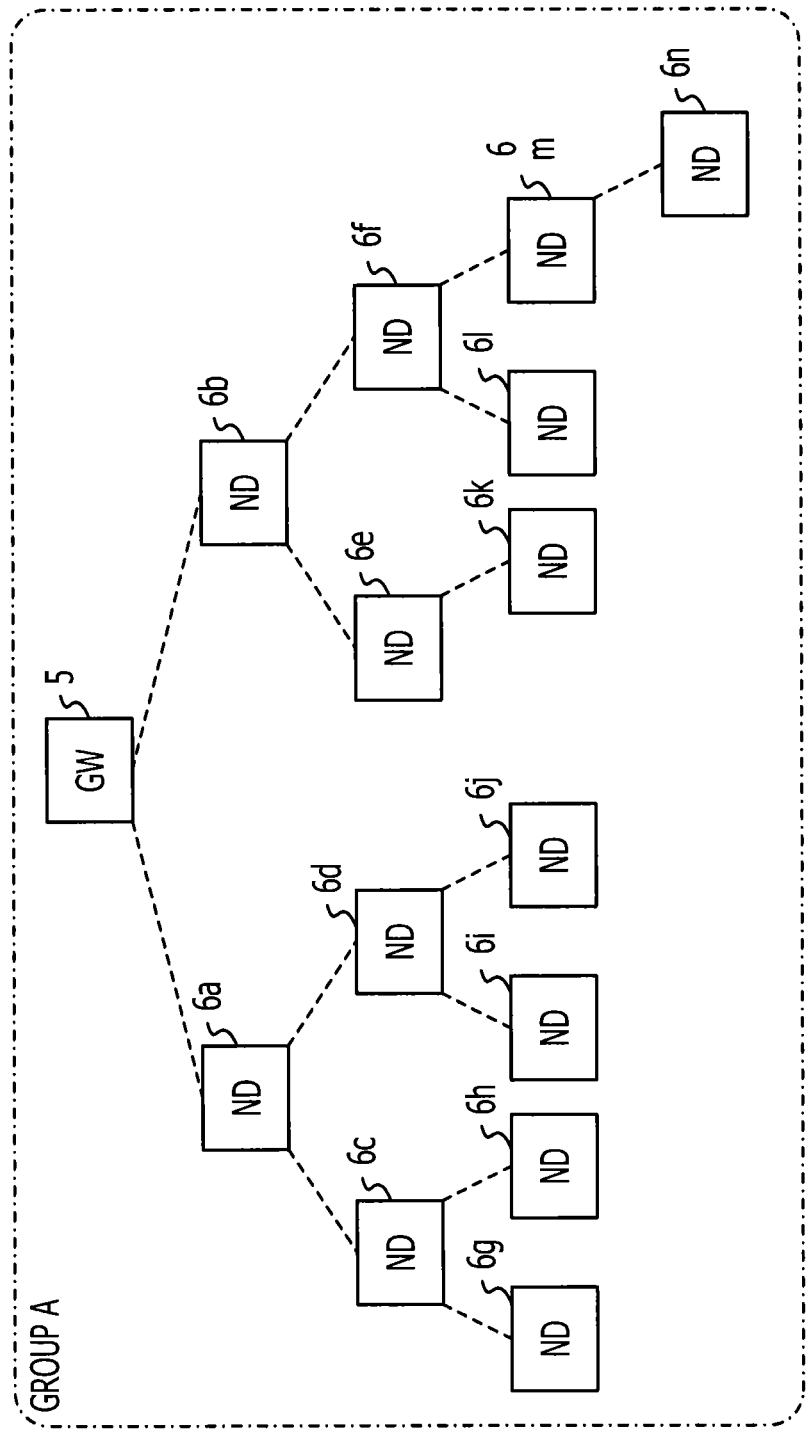
FIG. 8 is a diagram illustrating a first state of grouping.

The group notification unit 23 notifies each of the node devices 6a to 6n of the group determined by the gateway 5, to which each of the node devices 6a to 6n belongs. Before the ad-hoc network 2 is divided, all the node devices 6a to 6n forming the ad-hoc network 2 belong to a same group. In the example of the topology information table 28 illustrated in FIG. 7, the information elements "group" of all target nodes indicate the group A, and indicate that all the node devices 6a to 6n belong to the group A. FIG. 8 is a diagram illustrating a first state of grouping, where all the node devices 6a to 6n in the ad-hoc network 2 belong to the group A.

Referring back to FIG. 5, when each node device 6 serving as a child node within each group has issued a predetermined number of packets, the transmission time acquisition unit 24 acquires a measurement value Tm of a transmission time taken for the packets issued by all node devices 6 serving as child nodes to reach a representative node.

In the present description, the term "issue" is used with intent to indicate an operation for originally transmitting a packet from the target node device 6, and exclude an operation for transferring a packet received from another node device 6. In the present description, the term "transmit" includes issuing from the target node device 6 and transferring by the target node device 6.

Figure 9:
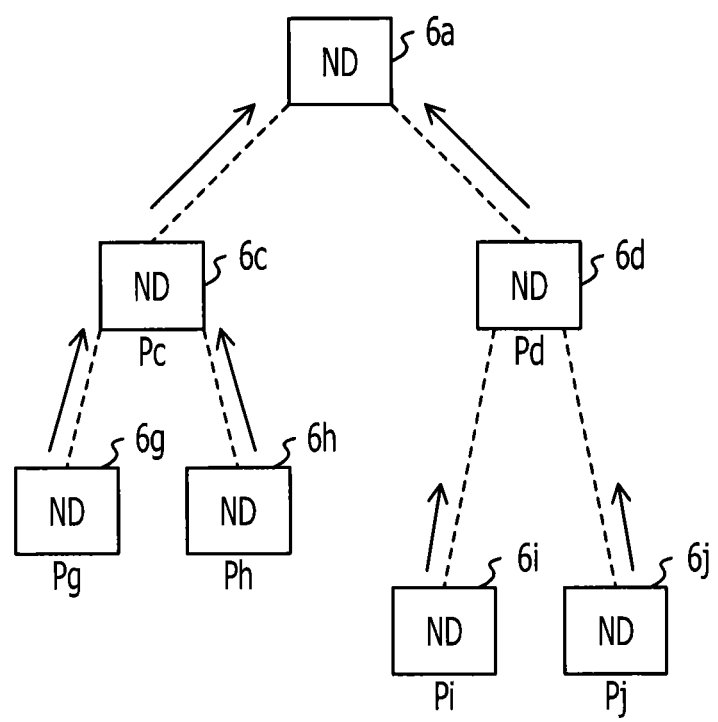
FIG. 9 is a diagram illustrating a transmission time.

FIG. 9 is a diagram illustrating a transmission time measured by the transmission time acquisition unit 24. A case is assumed where the transmission time of a group formed by the node devices 6a, 6c, 6d, and 6g to 6j is measured. The representative node of the tree structure of this group is the node device 6a, and node devices serving as child nodes are the node devices 6c, 6d, and 6g to 6j. It is assumed that Pc, Pd, and Pg to Pj are expected as the numbers of packets issued by the node devices 6c, 6d, and 6g to 6j occurring within the single intermittent operation cycle T.

When these packets are transmitted to the node device 6a, the node devices 6g and 6h originally transmit packets whose numbers correspond to Pg and Ph, respectively. The node device 6c originally transmits packets whose number corresponds to Pc and transfers the packets issued by the node devices 6g and 6h. Accordingly, the number of packets transmitted from the node device 6c is Pc+Pg+Ph. In the same way, the numbers of packets transmitted from the node devices 6d, 6i, and 6j are Pd+Pi+Pj, Pi, and Pj, respectively.

The node devices 6c, 6d, and 6g to 6j mutually adjust the transmission schedules of packets so that the transmission signals of a plurality of node devices do not interfere with one another. As a communication procedure for adjusting the transmission schedules, Carrier Sense Multiple Access/Collision Avoidance (CSMA/CA) is used, for example. While adjusting transmission schedules, the node devices 6c, 6d, and 6g to 6j transmit packets whose numbers correspond to Pc+Pg+Ph, Pd+Pi+Pj, Pg, Ph, Pi, and Pj, respectively. The measured transmission time is a time taken for transmission processing by the node devices 6c, 6d, and 6g to 6j.

When the gateway 5 is the representative node, the transmission time acquisition unit 24 measures a transmission time with respect to the group to which the gateway 5 belongs, by broadcasting a measurement control packet used for measuring a transmission time. In a state where the ad-hoc network 2 has not been divided yet, the transmission time acquisition unit 24 measures a transmission time taken for packets, issued by all the node devices 6a to 6n lower than the gateway 5, to reach the gateway 5.

FIG. 10 is a diagram illustrating an example of a measurement control packet. The measurement control packet includes information elements "packet type", "group", and "specified time". The information element "packet type" indicates that the measurement control packet is a control packet used for measuring a transmission time. The information element "group" indicates a group serving as a target of measuring a transmission time. The information element "specified time" specifies the start timing of transmission of a test packet used for measuring a transmission time, to a node device 6 that has received the measurement control packet.

Upon receiving the measurement control packet, each of the node devices 6 determines whether or not the value of the information element "group" of the received measurement control packet coincides with a group given notice of by the group notification unit 23. When a group given notice of by the measurement control packet is the same as the group given notice of by the group notification unit 23, the node device 6 waits for the specified time to come and starts transmission of a test packet at the specified time. The transmission time acquisition unit 24 determines whether or not a final test packet coming from the node devices 6 has been received, and determines, as a transmission time, a difference between the reception time of the final packet and the specified time.

After the ad-hoc network 2 has been divided, the transmission time acquisition unit 24 in the gateway 5 may cause the representative node of each group to implement the transmission of a measurement control packet, the reception of a test packet, and the calculation of the transmission time so as to acquire the measurement value Tm of the transmission time of a group to which the representative node belongs. The representative node of each group may voluntarily measure and transmit the transmission time of the group to the transmission time acquisition unit 24 in the gateway 5. The transmission time acquisition unit 24 in the gateway 5 may transmit, to the representative node of each group, a request packet for measuring a transmission time and cause the representative node to transmit the transmission time in each group.

When the measurement value Tm of a transmission time in a group is more than a predetermined target time Tt defined based on the active time period of the node device 6 within the intermittent operation cycle T, the divide unit 25 performs division processing on the group. Hereinafter, a group serving as the target to be divided is expressed as a "target group". In addition, in some case, the measurement value of the transmission time of a target group, acquired by the transmission time acquisition unit 24, is expressed as a first transmission time.

Figure 11A:
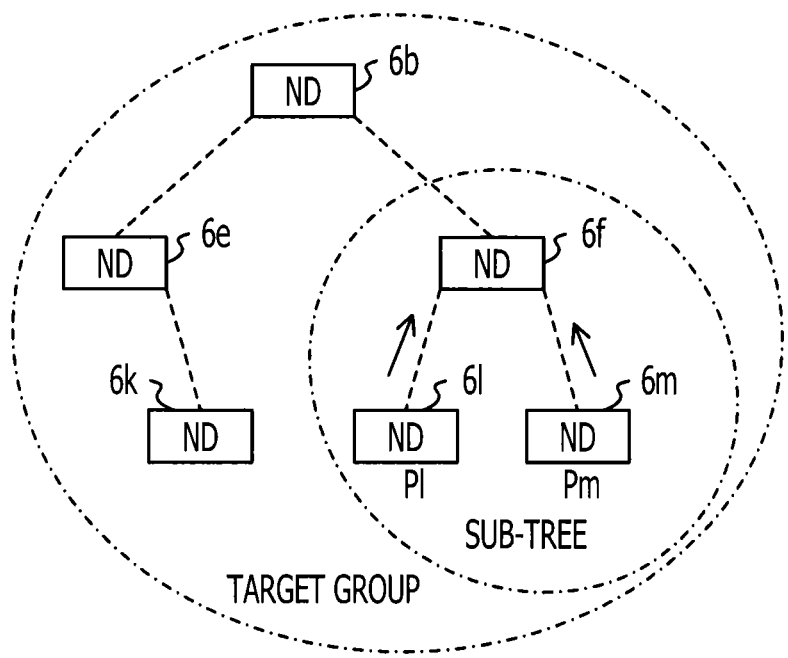
FIGS. 11A and 11B are diagrams illustrating a cutoff point.

Hereinafter, an example of a process for determining the cutoff point of a target group in the division processing will be described. FIG. 11A illustrates an example of the target group. The target group includes the node devices 6b, 6e, 6f, and 6k to 6m. The representative node of the target group is the node device 6b.

The node device 6f serving as one node within the target group is expressed as a "target node". A tree formed by the node device 6f serving as the target node and all the node devices 6l and 6m lower than the node device 6f within the target group is expressed as a "sub-tree". The node devices 6l and 6m are the child nodes of the sub-tree whose root is the node device 6f. It is assumed that Pl and Pm are expected as the numbers of issued packets occurring in the node devices 6l and 6m within the single intermittent operation cycle T.

The divide unit 25 determines whether or not a second transmission time becomes less than or equal to the target time Tt. The second transmission time is a time taken for the node devices 6l and 6m serving as the child nodes of the sub-tree to transmit packets so that the packets, whose numbers correspond to Pl and Pm, issued by the node devices 6l and 6m lower than the node device 6f reach the node device 6f. For example, the node device 6l transmits packets, whose number corresponds to Pl, issued by the node device 6l. The node device 6m transmits packets, whose number corresponds to Pm, issued by the node device 6m. The second transmission time is a processing time expected to be taken for the node devices 6*l* and 6*m* to transmit packets whose number corresponds to Pl+Pm.

Figure 11B:
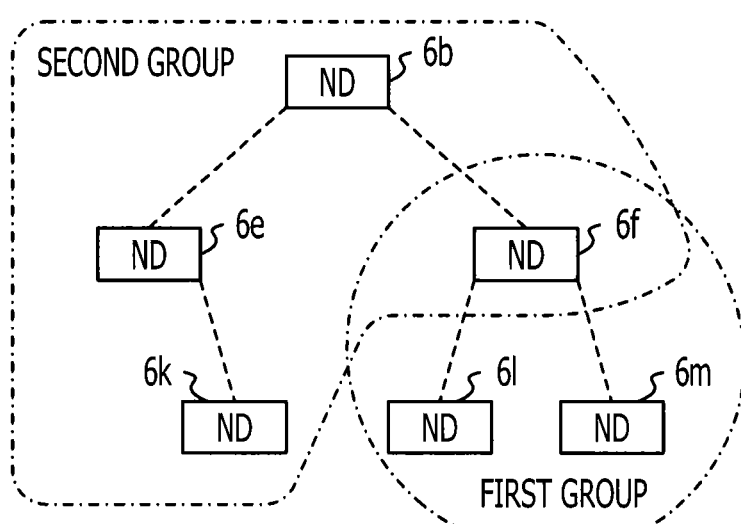

When the second transmission time is less than or equal to the target time Tt, the divide unit 25 may determine the target node 6*f* as a cutoff point. FIG. 11B illustrates an example of division of the target group in a case of being divided at the target node. When having been divided at the target node 6*f*, the target group is divided into a first group formed by the target node 6*f* and the child nodes 6*l* and 6*m* of the sub-tree and a second group including the node devices 6*b*, 6*e*, 6*f*, and 6*k* other than the child nodes 6*l* and 6*m* in the target group.

The first group generated in such division processing is expected to have a size where a time taken to transmit packets within the group becomes less than or equal to the target time Tt. Accordingly, by dividing the ad-hoc network 2 so that the second transmission time becomes less than or equal to the given target time Tt within the all groups, the packet transmission within each group may be expected to be completed within the desired target time Tt. Therefore, while a condition that the active time period of the node device 6 with respect to each intermittent operation cycle T is less than or equal to the given target time Tt is satisfied, it may be possible to reduce a situation where a transmission delay occurs owing to the fact that the node device 6 is inactivated before the packet transmission has been completed in each group.

The divide unit 25 determines, on the basis of the first transmission time acquired by the transmission time acquisition unit 24, whether or not the second transmission time becomes less than or equal to the target time Tt. The divide unit 25 estimates a first transmission number Sa serving as a sum of numbers of times the child nodes transmit packets so as to cause packets issued by the child nodes of the target group to reach the representative node.

In the example of the target group illustrated in FIG. 11A, the first transmission number Sa is a sum of numbers of times the child nodes 6*e*, 6*f*, and 6*k* to 6*m* transmit packets so as to cause the packets issued by the child nodes 6*e*, 6*f*, and 6*k* to 6*m* of the target group to reach the representative node 6*b*.

The divide unit 25 determines, by multiplying the first transmission number Sa by a transmission time ratio Rtm serving as a ratio (Tt/Tm) of the target time Tt to the first transmission time Tm, a target number St of packets transmittable within the target time Tt.

The divide unit 25 estimates a second transmission number Sg with respect to each node included in the target group. The second transmission number Sg is a sum of numbers of times the lower nodes of a target node included in the target group transmit packets so as to cause a predetermined number of packets issued by all the lower nodes of the target node to reach the target node.

In the example of the target group illustrated in FIG. 11A, it is assumed that the target node is the node device 6*f*. The second transmission number Sg is a sum of numbers of times the lower nodes 6*l* and 6*m* of the node device 6*f* included in the target group transmit packets so as to cause the packets issued by the node devices 6*l* and 6*m* lower than the node device 6*f* to reach the node device 6*f*.

By determining whether or not the second transmission number Sg is less than or equal to the target number St, the divide unit 25 determines whether or not the second transmission time is less than or equal to the target time.

Hereinafter, an example of the division processing performed by the divide unit 25 on the network illustrated in FIG. 6 will be described. It is assumed that the first transmission time Tm measured with respect to the group A serving as the whole ad-hoc network 2 before division illustrated in FIG. 8 is "28" msec and the target time Tt is "12" msec. The estimated numbers of the first transmission number Sa and the second transmission number Sg are stored in the topology information table 28 illustrated in FIG. 7.

The information element "number of issuances" indicates a scheduled number of packets issued within the single intermittent operation cycle T by each of the node devices 6*a* to 6*n* corresponding to each target row in the topology information table 28. While FIG. 7 illustrates an example where the numbers of packets to be issued are "1" for all the node devices 6*a* to 6*n*, a different value with respect to each node device 6 may be set as the number of packets issued by each of the node devices 6*a* to 6*n*, in accordance with an embodiment. The numbers of packets indicated by the following information elements "number of receptions" and "number of transmissions" are estimated in a case where the node devices 6*a* to 6*n* issue as many packets as indicated in the information elements "number of issuances".

The information element "number of receptions" indicates the number of packets received by the node of a target row. The number of receptions is calculated on the basis of the sum of the numbers of packets issued by lower nodes of the node of the target row. For example, the number of receptions of the gateway 5 is the sum of the numbers of packets issued by the 14 lower node devices 6*a* to 6*n*, "1"×14="14". The number of receptions of the node device 6*a* is the sum of the numbers of packets issued by the 6 lower node devices 6*c*, 6*d*, and 6*g* to 6*j*, "1"×6="6".

The information element "number of transmissions" indicates the number of packets transmitted from node devices lower than the node of a target row and included in the same group as that of the node of the target row so as to cause the packets issued by the node devices lower than the node of the target row to reach the node of the target row. The number of transmissions is the second transmission number Sg. The number of transmissions calculated with respect to the representative node of a group is used as the first transmission number Sa. The information element "number of transmissions" is calculated on the basis of a sum of the number of receptions of the node of a target row and the numbers of receptions of node devices lower than the node of the target row and included in the same group as that of the node of the target row.

For example, the number of receptions of the gateway 5 is "14". The numbers of receptions of the node devices 6*a* to 6*n* lower than the gateway 5 and included in the same group A of the gateway 5 are "6", "6", "2", "2", "1", "3", "0", "0", "0", "0", "0", "0", "1", and "0", respectively. The number of transmissions of the gateway 5 is the sum of these, "35". Since the gateway 5 is the representative node of the group A, the value of the first transmission number Sa is "35".

In addition, the number of receptions of the node device 6*a* is "6", and the numbers of receptions of the node devices 6*c*, 6*d*, and 6*g* to 6*j* lower than the node device 6*a* and included in the same group A of the node device 6*a* are "2", "2", "0", "0", "0", and "0", respectively. Therefore, the number of transmissions of the node device 6*a* is the sum of these, "10". The second transmission number Sg of the child node 6*a* is "10".

The divide unit 25 obtains the target number St=15 times by multiplying the transmission time ratio Rtm=the target time Tt (12 msec)/the first transmission time Tm (28 msec) by the first transmission number Sa (35 times). The first transmission number Sa indicated by the information element "number of transmissions" of the representative node of the group A is "35" times and more than the target number St. Therefore, it is not expected that the first transmission time of the group A becomes less than or equal to the target time Tt. In this case, the divide unit 25 performs the division processing on the group A.

Figure 13:
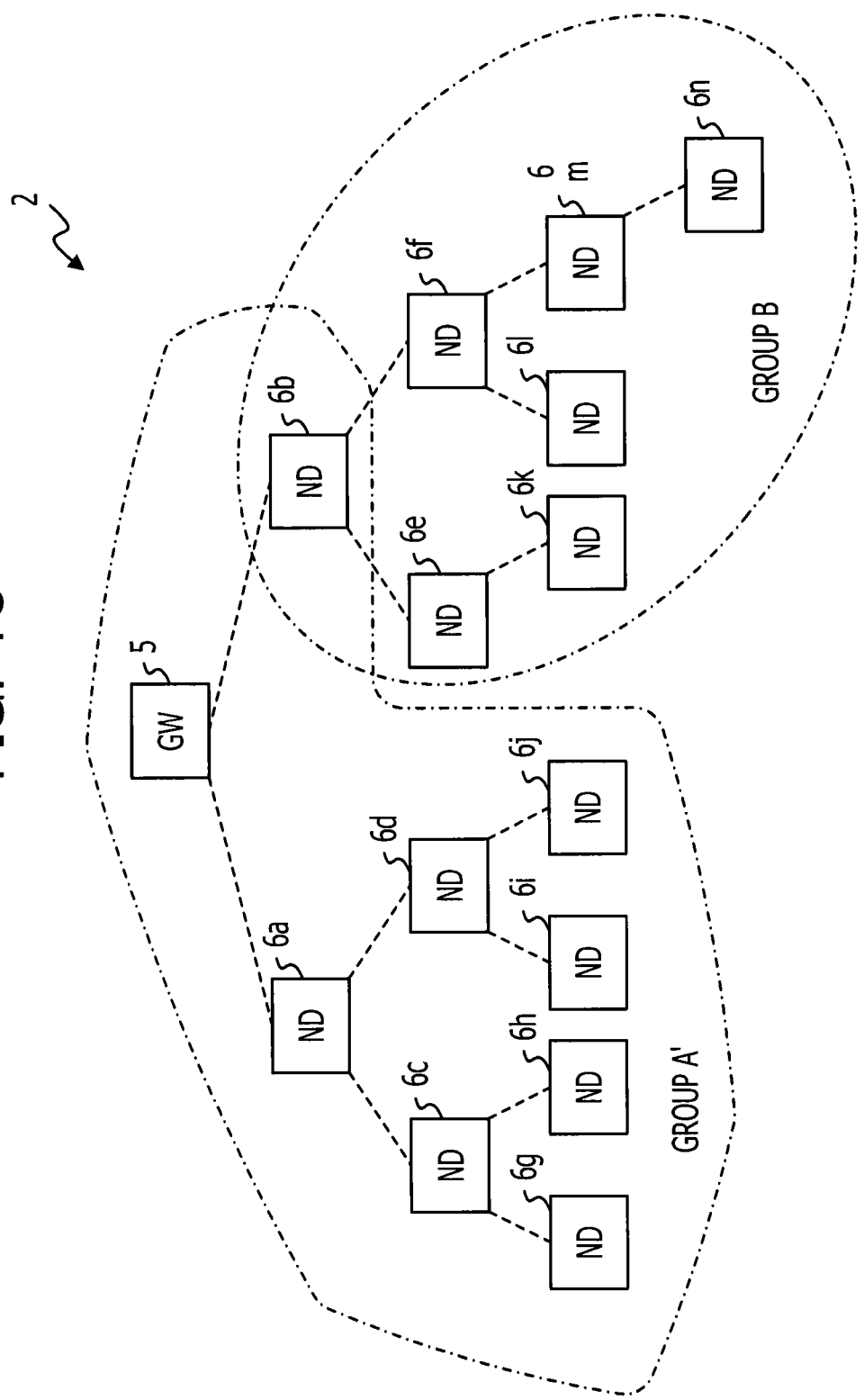
FIG. 13 is a diagram illustrating a second state of grouping.

The divide unit 25 selects, as a cutoff point from among the child nodes of the group A serving as a division target, a node device such that the information element "number of transmissions" thereof, namely, the second transmission number Sg, is the largest among the information elements "number of transmissions" smaller than the target number St. In the example of the topology information table 28 in FIG. 7, the node device 6b having the number of transmissions="11" is selected as the cutoff point. The divide unit 25 forms a group B with the node device 6b and the lower node devices 6e, 6f, and 6k to 6n belonging to the group A. In addition, the divide unit 25 forms a group A' with the gateway 5 and the node devices 6a to 6d and 6g to 6j where the node devices 6e, 6f, and 6k to 6n serving as the child nodes of the group B are excluded from the group A. The divide unit 25 reflects a division result in the information element "group" in the topology information table 28. FIG. 12 illustrates the topology information table 28 after the reflection of the division result. FIG. 13 illustrates the ad-hoc network 2 after the division.

When the group B has been separated from the group A', from among packet transmissions for transmitting the packets issued by the node devices 6e, 6f, and 6k to 6n serving as the child nodes of the group B to the representative node of the group A', transmissions within the group B are performed during the active time period of the group B. Accordingly, the second transmission number Sg of an upper node of the group B, which is located within the group A', is decreased by the value of the information element "number of transmissions" of the representative node of the group B. The number of transmissions of the node device 6b serving as the representative node of the group B is "11" times, and the second transmission number Sg, namely, the value of the information element "number of transmissions", of the gateway 5 serving as the upper node is updated to "24" times, obtained by subtracting "11" times from "35" times. The divide unit 25 reflects the update result of the second transmission number Sg in the topology information table 28.

At this time, the first transmission number Sa serving as the number of transmissions of the representative node of the group A' is "24" times and more than the target number St. This means that the first transmission time of the group A' after the division becomes more than the target time Tt. In this case, the divide unit 25 divides the group A' again.

Figure 15:
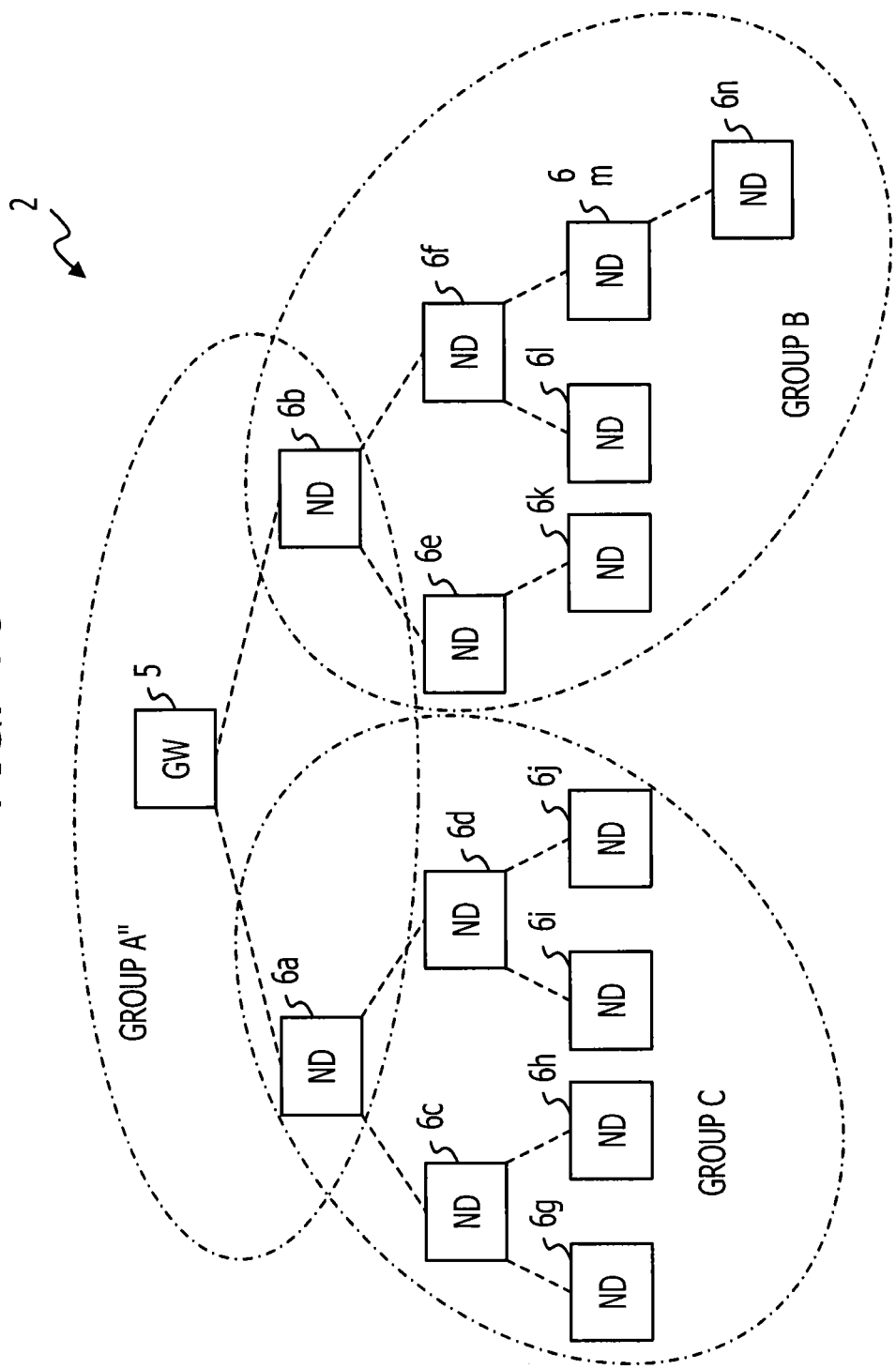
FIG. 15 is a diagram illustrating a third state of grouping.

From among the child nodes of the group A' illustrated in FIG. 13, a node device such that the information element "number of transmissions" thereof is the largest among the information elements "number of transmissions" smaller than the target number St is the node device 6a having the number of transmissions="10". The divide unit 25 forms a group C with the node device 6a and the lower node devices 6c, 6d, and 6g to 6j belonging to the group A'. In addition, the divide unit 25 forms a group A" with the gateway 5 and the node devices 6a and 6b where the node devices 6c, 6d, and 6g to 6j serving as the child nodes of the group C are excluded from the group A'. The divide unit 25 reflects a division result in the information element "group" in the topology information table 28. FIG. 14 illustrates the topology information table 28 after the reflection of the division result. FIG. 15 illustrates the ad-hoc network 2 after the division.

Owing to the separation of the group C, the second transmission number Sg of the gateway 5 is deceased by the value, "10" times, of the information element "number of transmissions" of the node device 6a serving as the representative node of the group C. Accordingly, the value of the information element "number of transmissions" of the gateway 5 is updated to "14" times, obtained by subtracting "10" times from "24" times. The divide unit 25 reflects the update result of the second transmission number Sg in the topology information table 28.

At this time, the first transmission number Sa, "14" times, of the representative node of the group A" becomes less than or equal to the target number St. This means that the first transmission time of the group A" after the division may be expected to become less than or equal to the target time Tt. In addition, with respect to the group B, the second transmission number Sg is also defined so as to become less than or equal to the target number St. In other words, it may be expected that a transmission time within the group B, taken to cause packets issued by node devices lower than the representative node 6b to reach the representative node 6b becomes less than or equal to the target time Tt. The same also applies to the group C. Therefore, in all the groups A" to C, the transmission times within the groups are less than or equal to the target time Tt, and it may be expected that even if, in these groups, the active time periods of the node devices with respect to each intermittent operation cycle T are set to the target time Tt, the transmission delay of a packet due to the inactivation of the node devices does not occur.

The group notification unit 23 notifies each node device 6 grouped by the divide unit 25 of the group to which each node device 6 belongs. The transmission time acquisition unit 24 acquires the measurement value of a transmission time in each group after the division. The divide unit 25 determines whether or not the measurement values of the transmission times in all the groups are less than or equal to the target time Tt, and repeats the above-described division processing with respect to a group whose transmission time is more than the target time Tt.

When the measurement values of the transmission times in all the groups have become less than or equal to the target time Tt, the schedule determination unit 26 determines the active time period and the inactive time period of each group. The schedule determination unit 26 generates a schedule information table 29 used for storing therein schedule information indicating the active time period and the inactive time period of each group. Hereinafter, the schedule information table 29 will be described with reference to an example of the division result of the ad-hoc network 2 illustrated in FIG. 16.

Figure 16:
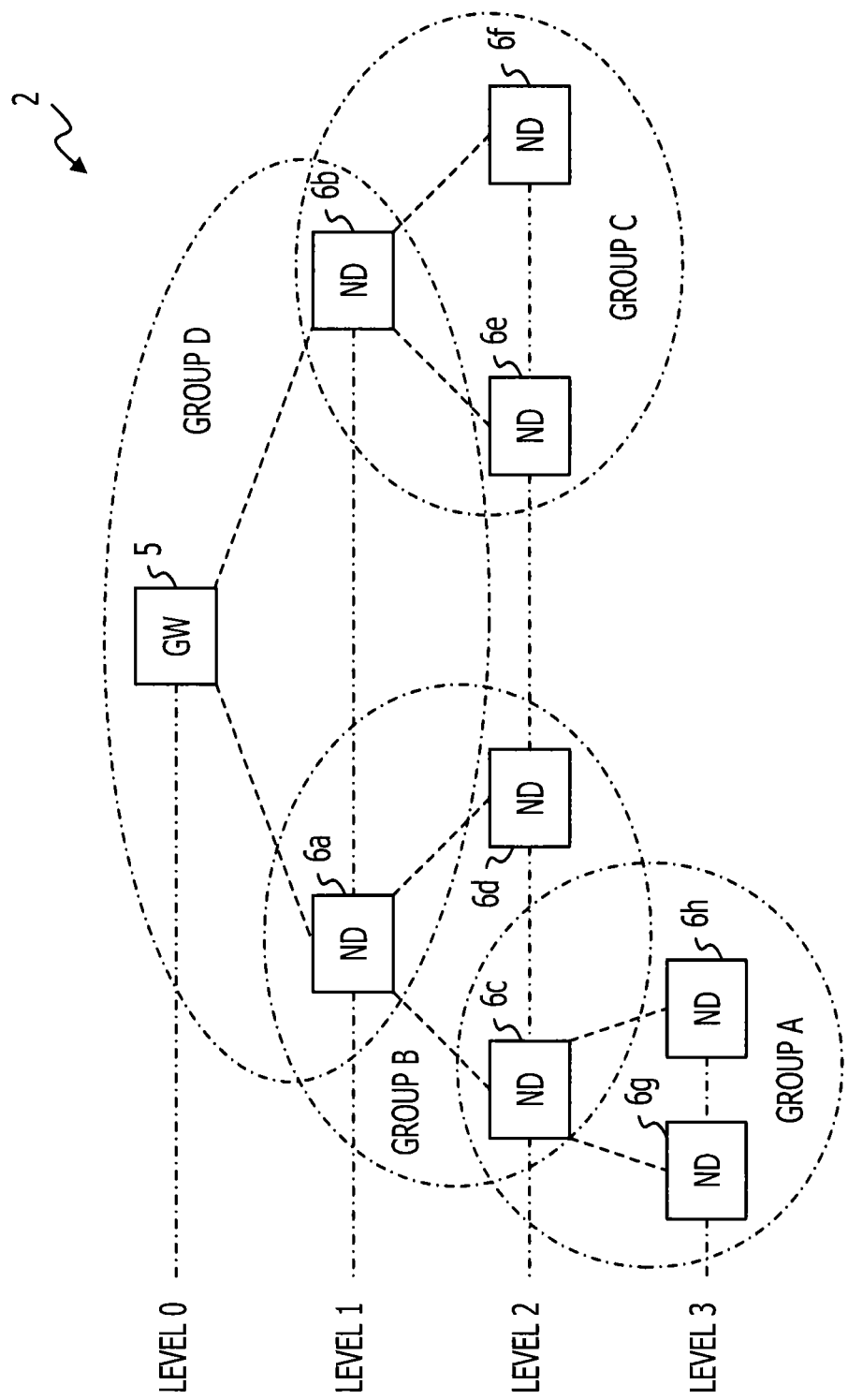
FIG. 16 is a diagram illustrating an example of a division result of a wireless ad-hoc network.

In the example illustrated in FIG. 16, the ad-hoc network 2 is divided into groups A, B, C, and D. The group A is formed by the node devices 6c, 6g, and 6h. The representative node of the group A is the node device 6c. The node devices 6g and 6h are lower nodes of the node device 6c, directly connected to the node device 6c. The group B is formed by the node devices 6a, 6c, and 6d. The representative node of the group B is the node device 6a. The node devices 6c and 6d are lower nodes of the node device 6a, directly connected to the node device 6a.

The group C is formed by the node devices 6b, 6e, and 6f. The representative node of the group C is the node device 6b. The node devices 6e and 6f are lower nodes of the node device 6b, directly connected to the node device 6b. The group D is formed by the gateway 5 and the node devices 6a and 6b. The representative node of the group D is the gateway 5. The node devices 6a and 6b are lower nodes of the gateway 5, directly connected to the gateway 5. The level of the gateway 5 is "0", the levels of the node devices 6a and 6b are "1", the levels of the node devices 6c to 6f are "2", and the levels of the node devices 6g and 6h are "3".

FIG. 17A illustrates an example of the schedule information table 29. The schedule information table 29 includes information elements "rank", "group", "representative node", "transmission time", "activation timing", and "inactivation timing". The information element "group" indicates a target group of each row in the schedule information table 29. The information element "rank" indicates a rank where an active time period is assigned to the target group in a single intermittent operation cycle T. The information element "representative node" indicates a representative node of the target group.

The information element "transmission time" indicates the measurement value of the transmission time of the target group, acquired by the transmission time acquisition unit 24. The information elements "activation timing" and "inactivation timing" indicate relative start timings of an active time period and an inactive time period with respect to the start timing of each intermittent operation cycle T.

The schedule determination unit 26 assigns an earlier active time period to a group farther away from the gateway 5 in decreasing order of distance. In the example illustrated in FIG. 16, the group A is the farthest from the gateway 5, the groups B and C are in a same rank and the second farthest, and the group D is the nearest to the gateway 5. Accordingly, the schedule determination unit 26 sets the rank of the group A farthest from the gateway 5 to the first place that is the earliest and the rank of the group D to the fourth place that is the latest. Any one of the groups B and C in the same rank may be set to an earlier rank.

The schedule determination unit 26 stores, in the schedule information table 29, the measurement value of the transmission time of each group, acquired by the transmission time acquisition unit 24. The schedule determination unit 26 determines a length of the active time period of each group in accordance with the measurement value of the transmission time of each group. For example, the schedule determination unit 26 may determine the measurement value of the transmission time of each group as the length of the active time period of each group, or set the length of the active time period to a length proportional to the measurement value.

In accordance with the rank and the length of the active time period of each group, the schedule determination unit 26 determines the activation timing and the inactivation timing so that the active time periods of respective groups are mutually disjoint. The schedule determination unit 26 stores the determined activation timing and inactivation timing in the schedule information table 29. FIG. 17B illustrates examples of the activation timing and the inactivation timing.

In the present example, the measurement value of the transmission time of each group is determined as the length of the active time period of each group. The measurement values of the transmission times of the groups A, C, B, and D are "12" msec, "12" msec, "8" msec, and "14" msec, respectively. The active time period of node devices of the group A is designated as an interval of 12 msec after the start timing of the intermittent operation cycle T. The active time period of node devices of the group C is designated as an interval of 12 msec subsequent to an interval of 12 msec after the start timing of the intermittent operation cycle T. The active time period of node devices of the group B is designated as an interval of 8 msec subsequent to an interval of 24 msec after the start timing of the intermittent operation cycle T. The active time period of node devices of the group D is designated as an interval of 14 msec subsequent to an interval of 32 msec after the start timing of the intermittent operation cycle T.

The schedule notification unit 27 notifies the representative node of each group of the schedule information stored in the schedule information table 29. Upon receiving the schedule information, each representative node notifies node devices 6 within the group to which each representative node belongs of the schedule information.

4. Process for Controlling Active Time Period

Figure 18:
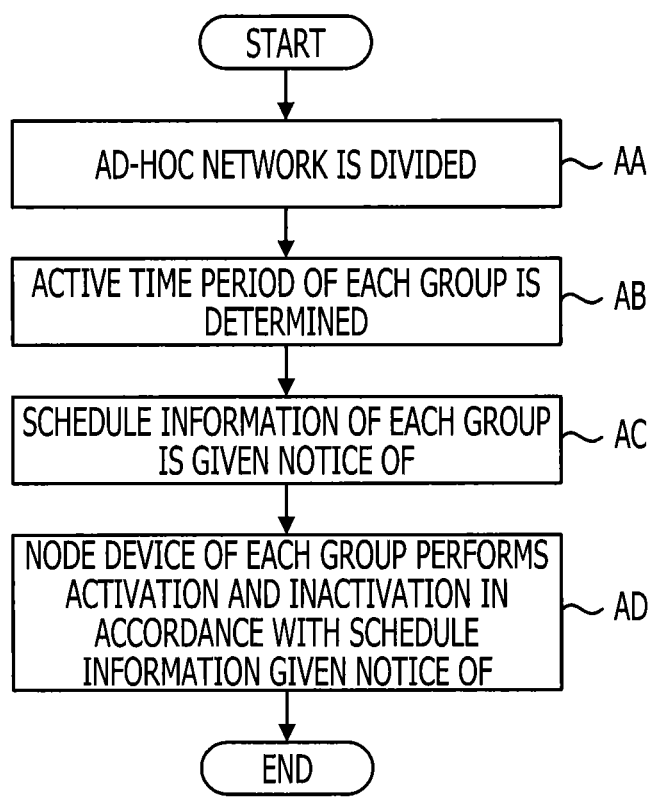
FIG. 18 is a diagram illustrating an example of an operation flow of active time period control processing.

A process for controlling the active time period of a node device 6 in the ad-hoc network 2 will be described. FIG. 18 illustrates an example of an operation flow of a process for controlling the active time period in the ad-hoc network 2. A sequence of operations illustrated in FIG. 18 may be construed as a method including a plurality of procedures. The same applies to the processes illustrated in FIG. 19 to FIG. 21.

In AA, the gateway 5 divides the ad-hoc network 2 into a plurality of groups. In AB, the gateway 5 determines the active time period of each group determined in AA. In AC, the gateway 5 notifies the node devices 6 of the schedule information specifying the active time period of each group. In AD, when the operation of the ad-hoc network 2 has been started, each node device 6 performs activation and inactivation in each intermittent operation cycle T in accordance with the schedule information given notice of by the gateway 5.

Figure 19:
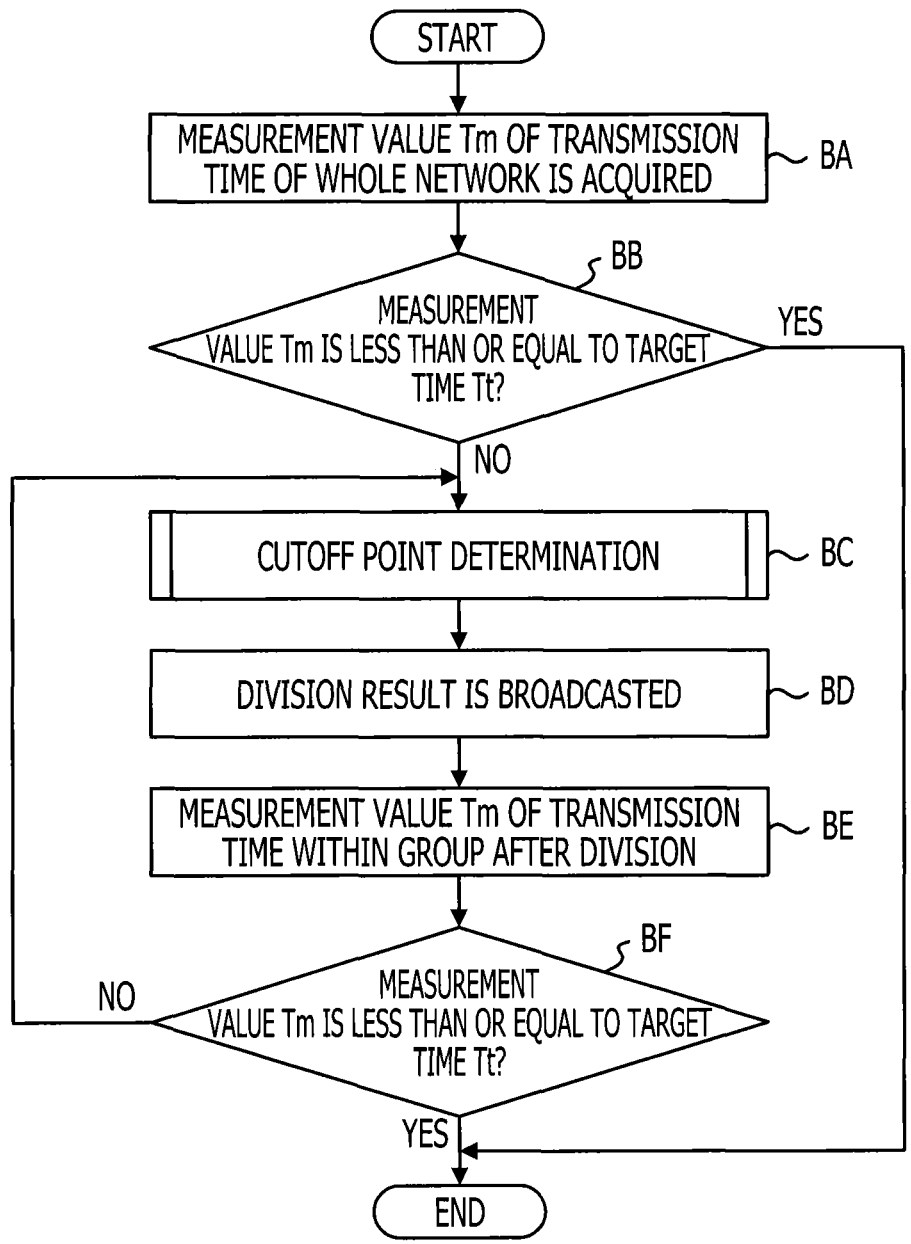
FIG. 19 is a diagram illustrating an example of an operation flow of network division processing.

The network division processing in AA in FIG. 18 will be described with reference to FIG. 19. In BA, the transmission time acquisition unit 24 acquires the measurement value Tm of the transmission time of the whole ad-hoc network 2. In BB, the divide unit 25 determines whether or not the measurement value Tm is less than or equal to the predetermined target time Tt. When the measurement value Tm is less than or equal to the predetermined target time Tt (BB: YES), the processing is terminated. When the measurement value Tm is more than the predetermined target time Tt (BB: NO), the processing proceeds to BC.

In BC, the divide unit 25 determines the cutoff point of the ad-hoc network 2. In BD, the group notification unit 23 broadcasts, to the node devices 6, the groups to which the respective node devices 6 belong in a case where the ad-hoc network 2 is divided at the cutoff point.

In BE, the transmission time acquisition unit 24 acquires the measurement value Tm of the transmission time in each group. In BF, the divide unit 25 determines whether or not the measurement values Tm are less than or equal to the target time Tt in all the groups. When the measurement value Tm is more than the target time Tt in one group (BF: NO), the processing returns to BC. The divide unit 25 repeats BC to BF again with respect to the group where the measurement value Tm is more than the target time Tt. When the measurement values Tm are less than or equal to the target time Tt in all the groups (BF: YES), the processing is terminated.

Figure 20:
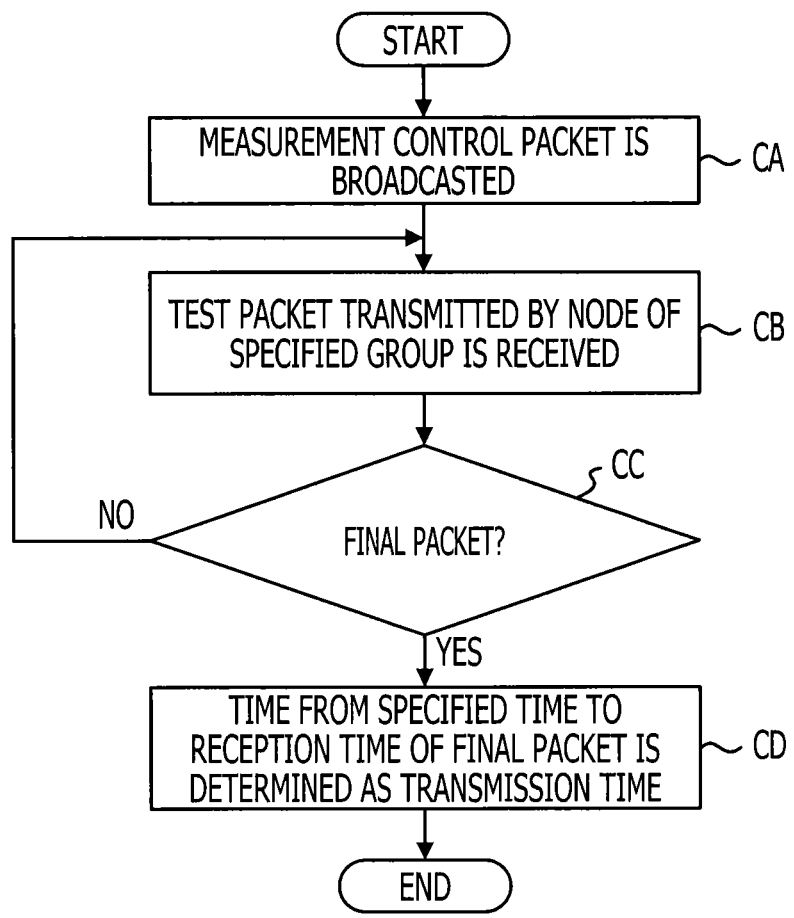
FIG. 20 is a diagram illustrating an example of an operation flow of transmission time measurement processing.

The transmission time measurement processing in BA in FIG. 19 will be described with reference to FIG. 20. When, in BE, the transmission time of each group is measured after the ad-hoc network has been divided, the following processing may be executed by the representative node of each group.

In CA, the transmission time acquisition unit 24 broadcasts a measurement control packet illustrated in FIG. 10. In CB, the transmission time acquisition unit 24 receives test packets transmitted from node devices 6 specified by the information element "group" in the measurement control packet. In CC, the transmission time acquisition unit 24 determines whether or not a final packet has been received. When the final packet has not been received (CC: NO), the processing returns to CB. When the final packet has been received (CC: YES), the processing proceeds to CD. In CD, the transmission time acquisition unit 24 determines, as the transmission time, a time that has elapsed from the time of the information element "specified time" of the measurement control packet until the reception time of the final packet.

Figure 21:
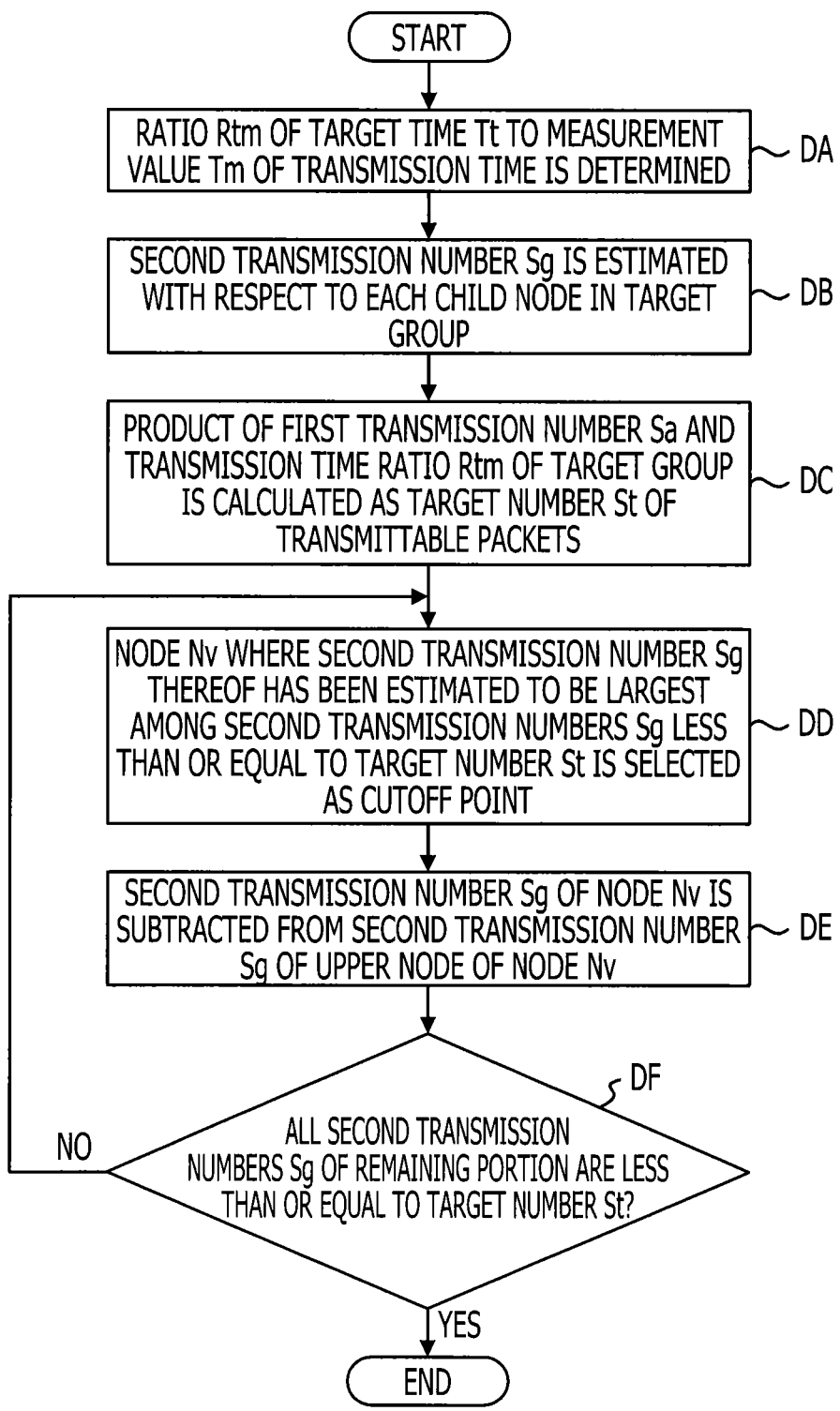
FIG. 21 is a diagram illustrating an example of an operation flow of cutoff point determination processing.

The cutoff point determination processing in BC in FIG. 19 will be described with reference to FIG. 21. In DA, the divide unit 25 determines the transmission time ratio Rtm=Tt/Tm of the target time Tt to the measurement value Tm of the transmission time of the target group to be divided. In DB, the divide unit 25 estimates the second transmission number Sg with respect to each child node included in the target group. In DC, the divide unit 25 estimates the first transmission number Sa with respect to the target group. By multiplying the first transmission number Sa by the transmission time ratio Rtm, the divide unit 25 determines the target number St of packets transmittable within the target time Tt.

In DD, the divide unit 25 selects, as the cutoff point of the target group, a node device Nv where the second transmission number Sg thereof has been estimated to be the largest among the second transmission numbers Sg less than or equal to the target number St. In DE, the divide unit 25 subtracts the second transmission number Sg estimated with respect to the node device Nv from the second transmission number Sg estimated with respect to a node device higher than the node device Nv.

In DF, the divide unit 25 determines whether or not all the second transmission numbers Sg of node devices 6 serving as a remaining portion of the target group, obtained by excluding the child nodes of the node device Nv from the target group, are less than or equal to the target number St. When the second transmission numbers Sg are less than or equal to the target number St (DF: YES), the processing is terminated. When one of the second transmission numbers Sg is more than the target number St (DF: NO), the processing returns to DD.

The functions of the packet transmission unit 20, the packet reception unit 21, the topology information generation unit 22, the group notification unit 23, the transmission time acquisition unit 24, the divide unit 25, the schedule determination unit 26, and the schedule notification unit 27 are performed by the processor 10 illustrated in FIG. 4. The specified value of the predetermined target time Tt, the topology information table 28, and the schedule information table 29 are stored in the memory 11 or auxiliary storage device 12 illustrated in FIG. 4.

Figure 22:
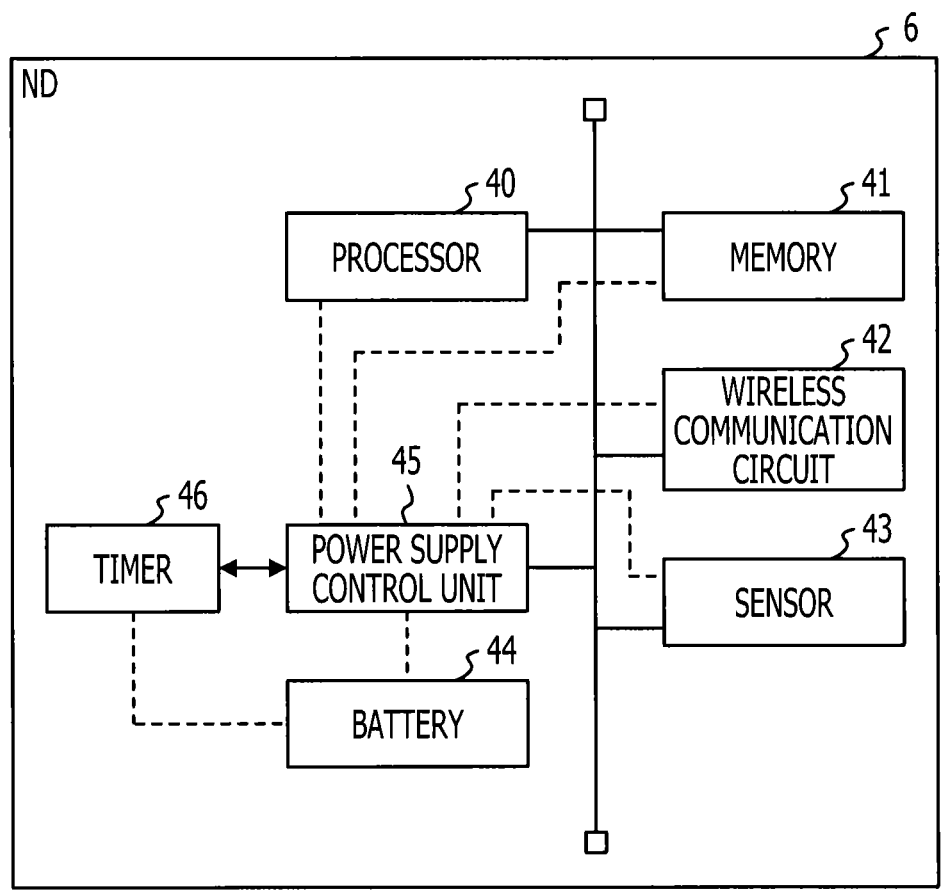
FIG. 22 is a diagram illustrating an example of a hardware configuration of a sensor node device.

5. Embodiment of Sensor Node Device 5.1. Example of Hardware Configuration of Sensor Node Device An embodiment of the node device 6 will be described. FIG. 22 is a diagram illustrating an example of a hardware configuration of the node device 6. The node device 6 includes a processor 40, a memory 41, a wireless communication circuit 42, a sensor 43, a battery 44, a power supply control unit 45, and a timer 46. The hardware configuration illustrated in FIG. 22 is one of exemplifications of a hardware configuration realizing the node device 6. Any other hardware configuration may be adopted if the hardware configuration allows execution of processing of the node device 6 described later.

By executing a control program stored in the memory 41, the processor 40 executes each processing for controlling the node device 6 and the processing for controlling an active time period described later. The memory 41 stores a control program that causes the processor 40 to execute an operation. The memory 41 also stores a program currently being executed by the processor 40, and data temporarily used by the processor 40 in executing the program. The memory 11 may include a random access memory. The memory 11 may additionally include, as a storage element, a nonvolatile memory, a read-only memory, or the like.

The wireless communication circuit 42 performs wireless communication processing with the gateway 5 and other node devices 6. The sensor 43 detects the physical value regarding a sensing target of the node device 6. The battery 44 supplies driving electric power for the node device 6. Dashed lines in FIG. 22 indicate power-supply lines supplying power from the battery 44 to each portion within the node device 6. In accordance with instructions of the processor 40, the power supply control unit 45 controls supply of power from the battery 44 to each portion within the node device 6. When the processor 40 supplies a pause command with a specified inactive time period to the power supply control unit 45, the power supply control unit 45 causes the timer 46 to start timing the specified inactive time period and disconnects supply of power from the battery 44 to the each portion within the node device 6. Owing to the disconnection of supply of power, the node device 6 is put into an inactive state. When the timer 46 has finished the timing of the specified inactive time period, the power supply control unit 45 starts supplying power to each portion within the node device 6. Owing to the supply of power, the node device 6 is put into an active state.

5.2. Example of Functional Configuration of Sensor Node Device

Figure 23:
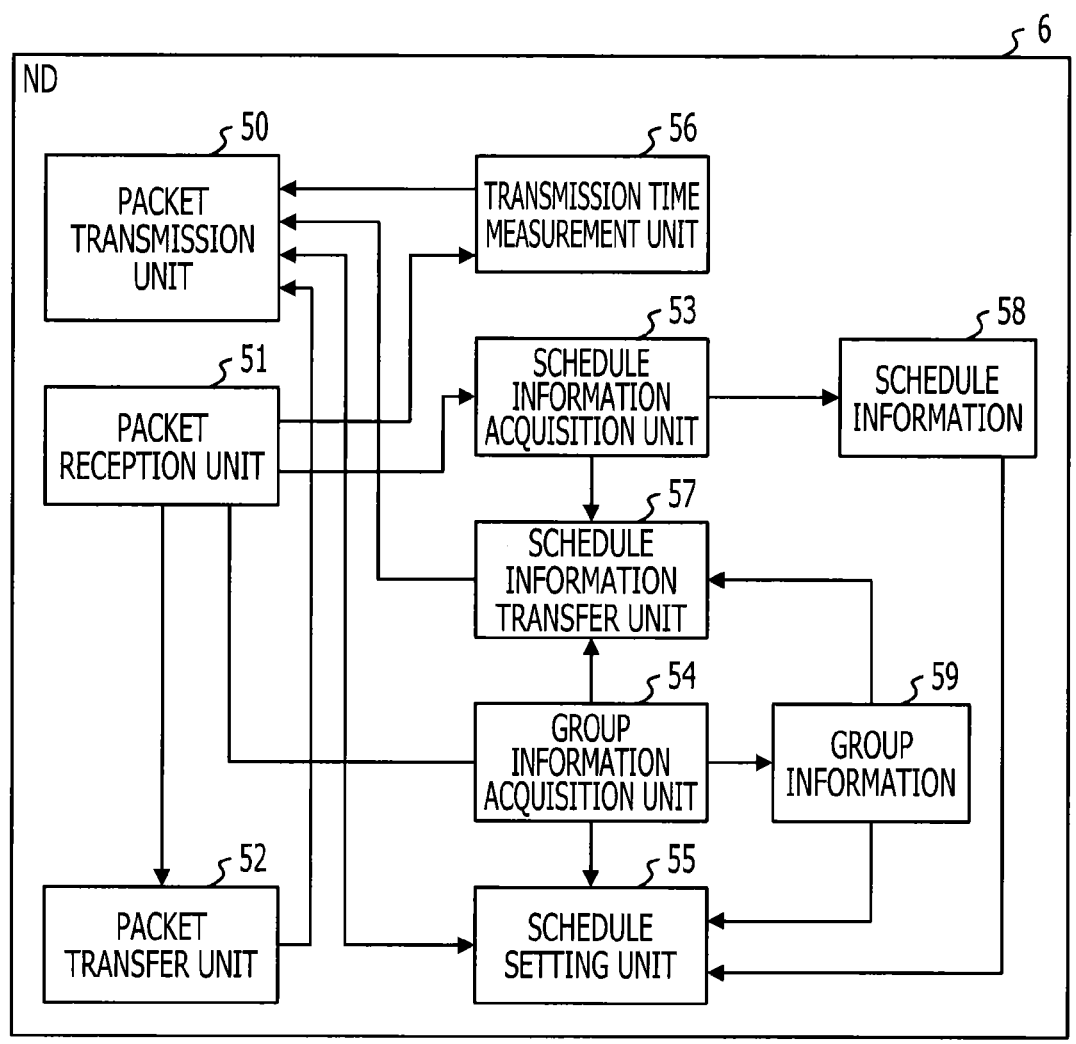
FIG. 23 is a diagram illustrating an example of a functional configuration of a sensor node device.

FIG. 23 is a diagram illustrating an example of a functional configuration of the node device 6. The node device 6 includes a packet transmission unit 50, a packet reception unit 51, a packet transfer unit 52, a schedule information acquisition unit 53, a group information acquisition unit 54, a schedule setting unit 55, a transmission time measurement unit 56, and a schedule information transfer unit 57.

The packet transmission unit 50 and the packet reception unit 51 performs processing for transmitting a packet to another node such as the gateway 5 or another node device 6 and processing for receiving a packet transmitted from another node, through a wireless communication channel realized by the wireless communication circuit 42. The packet transfer unit 52 performs processing for transferring a packet received from another node.

The schedule information acquisition unit 53 acquires and stores schedule information 58 transmitted from the gateway 5 in the memory 41 in FIG. 23. The group information acquisition unit 54 acquires and stores group information 59, broadcasted from the gateway 5, in the memory 41.

The schedule setting unit 55 defines an inactive time period in accordance with the schedule information 58 and provides the power supply control unit 45 with a pause command. At this time, on the basis of the group information 59, the schedule setting unit 55 determines whether or not the node device 6 is a representative node. When the node device 6 belongs to two groups, the schedule setting unit 55 determines that the node device 6 is a representative node.

When the node device 6 is a representative node, the schedule setting unit 55 generates a pause command so that the node device 6 operates during the active time periods of the two groups. In addition, the schedule setting unit 55 provides the packet transmission unit 50 with a transmission prohibit command during the active time period of a lower group so that the node device 6 does not transfer or issue a packet during the inactive time period of the upper group of these two groups. Accordingly, the packet transmission unit 50 transmits a packet received from the node device 6 of the lower group, during the active time period of the upper group.

When the node device 6 is a representative node, the schedule setting unit 55 determines whether or not the packet transmission from the node device 6 has been completed during each intermittent operation cycle T. When the packet transmission from the node device 6 has been completed, since there is no data to be transmitted from the node device 6 during the active time period of the upper group, the schedule setting unit 55 provides the power supply control unit 45 with a pause command before the arrival of the inactive time period of the upper group. By extending the inactive time period in such a way, the power consumption of the node device 6 may be further reduced.

In a case where the node device 6 is a representative node, when a predetermined number of packets have been issued by each child node of a group whose representative node is the node device 6, the transmission time measurement unit 56 measures a transmission time Tm taken for the packets issued by all the child nodes to reach the node device 6. A method for measuring the transmission time Tm is the same as the measurement method of the transmission time acquisition unit 24 described with reference to FIG. 20. Upon receiving a measurement control packet, the transmission time measurement unit 56 transmits a test packet used for measuring a transmission time, at a time specified by the information element "specified timing" of the measurement control packet.

The schedule information transfer unit 57 determines, on the basis of the group information 59, whether or not the node device 6 is a representative node. When the node device 6 is a representative node, the schedule information transfer unit 57 transfers the schedule information acquired by the group information acquisition unit 54 to a node device 6 serving as a child node of the same group.

The functions of the packet transmission unit 50, the packet reception unit 51, the packet transfer unit 52, the schedule information acquisition unit 53, the group information acquisition unit 54, the schedule setting unit 55, the transmission time measurement unit 56, and the schedule information transfer unit 57 are performed by the processor 40 in FIG. 22. The schedule information 58 and the group information 59 are stored in the memory 41 in FIG. 22.

6. Advantageous Effects of Embodiments

According to the embodiments, by dividing the ad-hoc network into a plurality of groups and reducing the number of the node devices 6 simultaneously operating, it may be possible to shorten the active time period of each node device 6 in a single intermittent operation cycle T. Accordingly, it may be possible to reduce the power consumption of the node device 6.

According to the embodiments, a time taken for a packet to be transmitted within each group, and a network is divided so that the transmission time falls within a predetermined target time. In addition, respective groups alternately operate in order of distance from the gateway 5 with the farthest one first. Therefore, while a condition that the active time period of the node device 6 is less than or equal to the given target time Tt is satisfied, it may be possible to reduce a situation where a transmission delay occurs owing to the fact that the node device 6 is inactivated before the completion of packet transmission within each group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A gateway node device that connects an ad-hoc network to another network, the ad-hoc network having a tree structure formed by sensor node devices intermittently operating and the gateway node device as a root of the tree structure, the gateway node device comprising:
   a processor; and
   a memory which stores a plurality of instructions, which when executed by the processor, cause the processor to execute:
      determining to divide a first tree included in the tree structure, the first tree including a first node device as a root of the first tree,
      dividing, upon determining to divide the first tree, the first tree into a second tree and a third tree at a second node device different from the first node device, the second node device being a root of the second tree, the second node device being a child node of the third tree,
      assigning active time periods within an intermittent operation cycle to the respective second and third trees, the assigned active time periods being mutually disjoint, and
      notifying sensor node devices included in the first tree of the assigned active time periods,
      wherein the second tree and the third tree are not the same tree.

2. The gateway node device according to claim 1, wherein the processor further executes:
   acquiring a measurement value of a first transmission time taken for a predetermined number of first packets to reach the first node device, the predetermined number of first packets being issued by all of child nodes of the first tree,
   determining, based on the first transmission time, whether a second transmission time is less than or equal to a target time, the second transmission time being taken for all of child nodes of the second tree to transmit a predetermined number of second packets issued by all of the child nodes of the second tree so that the predetermined number of second packets reach the second node device, and
   determining whether to divide the first tree, based on whether the second transmission time is less than or equal to the target time.

3. The gateway node device according to claim 2, wherein the processor further executes:
   estimating a first transmission number which is a sum of numbers of times all of the child nodes of the first tree transmit packets so that the predetermined number of first packets reach the first node device,
   estimating a second transmission number which is a sum of numbers of times all of the child nodes of the second tree transmit packets so that the predetermined number of second packets reach the second node device, and
   determining whether the second transmission time is less than or equal to the target time, based on the first transmission time, the first transmission number, and the second transmission number.

4. The gateway node device according to claim 2, wherein the processor determines a length of the active time period assigned to the second tree based on the second transmission time.

5. The gateway node device according to claim 1, wherein the active time period assigned to the second tree is earlier than the active time period assigned to the third tree within the intermittent operation cycle.

6. A communication system comprising:
a plurality of sensor node devices intermittently operating; and
a gateway node device that connects an ad-hoc network to another network, the ad-hoc network having a tree structure formed by the plurality of sensor node devices and the gateway node device as a root of the tree structure, the gateway node device including:
a processor; and
a memory which stores a plurality of instructions, which when executed by the processor, cause the processor to execute:
determining to divide a first tree included in the tree structure, the first tree including a first node device as a root of the first tree,
dividing, upon determining to divide the first tree, the first tree into a second tree and a third tree at a second node device different from the first node device, the second node device being a root of the second tree, the second node device being a child node of the third tree,
assigning active time periods within an intermittent operation cycle to the respective second and third trees, the assigned active time periods being mutually disjoint, and
notifying sensor node devices included in the first tree of the assigned active time periods,
wherein each of the plurality of sensor node devices includes a control circuit to switch each of the plurality of sensor node devices between an inactive state and an active state within the intermittent operation cycle based on each active time period notified by the gateway node device,
wherein the second tree and the third tree are not the same tree.

7. A method for controlling an active time period of an intermittent operation of each of a plurality of sensor node devices forming an ad-hoc network having a tree structure, the method comprising:
determining, by a gateway node device that connects the ad-hoc network to another network, to divide a first tree included in the tree structure, the first tree including a first node device as a root of the first tree;
dividing, upon determining to divide the first tree, the first tree into a second tree and a third tree at a second node device different from the first node device, the second node device being a root of the second tree, the second node device being a child node of the third tree;
assigning active time periods within an intermittent operation cycle to the respective second and third trees, the assigned active time periods being mutually disjoint; and
notifying sensor node devices included in the first tree of the assigned active time periods,
wherein the first tree and the second tree are not the same tree.

8. A non-transitory computer-readable recording medium storing a program that causes a processor to execute a procedure, the processor being included in a gateway node device that connects an ad-hoc network to another network, the ad-hoc network having a tree structure formed by sensor node devices intermittently operating, the procedure comprising:
determining to divide a first tree included in the tree structure, the first tree including a first node device as a root of the first tree;
dividing, upon determining to divide the first tree, the first tree into a second tree and a third tree at a second node device different from the first node device, the second node device being a root of the second tree, the second node device being a child node of the third tree;
assigning active time periods within an intermittent operation cycle to the respective second and third trees, the assigned active time periods being mutually disjoint; and
notifying sensor node devices included in the first tree of the assigned active time periods,
wherein the second tree and the third tree are not the same tree.

* * * * *